(12) United States Patent
Matsugatani et al.

(10) Patent No.: US 7,382,737 B2
(45) Date of Patent: Jun. 3, 2008

(54) INFORMATION DISTRIBUTION SYSTEM

(75) Inventors: Kazuoki Matsugatani, Kariya (JP); Kenji Muto, Kariya (JP)

(73) Assignee: Denso Corporation, Kariya (JP)

( * ) Notice: Subject to any disclaimer, the term of this patent is extended or adjusted under 35 U.S.C. 154(b) by 855 days.

(21) Appl. No.: 10/800,075

(22) Filed: Mar. 12, 2004

(65) Prior Publication Data

US 2004/0179487 A1    Sep. 16, 2004

(30) Foreign Application Priority Data

Mar. 14, 2003  (JP) ............................. 2003-070102

(51) Int. Cl.
*H04L 12/26* (2006.01)
(52) U.S. Cl. ................ 370/253; 370/335; 370/476
(58) Field of Classification Search ................ 370/218, 370/300, 230, 231, 232
See application file for complete search history.

(56) References Cited

U.S. PATENT DOCUMENTS 5,311,516 A * 5/1994 Kuznicki et al. ............ 370/314
5,404,505 A * 4/1995 Levinson ...................... 707/10
6,307,487 B1  10/2001 Luby
7,024,156 B2 * 4/2006 Kawamata et al. ........ 455/3.02

* cited by examiner

*Primary Examiner*—Brian Nguyen
*Assistant Examiner*—Ben H Liu
(74) *Attorney, Agent, or Firm*—Harness, Dickey & Pierce, PLC

(57) ABSTRACT

Fragment data is generated with respect to a certain data aggregate that is one of a plurality of data aggregates using a coded matrix. The fragment data is capable of restoring the certain data aggregate based on the coded matrix when the fragment data is collected to a required count. The generated fragment data is provided with an identification code associated with the certain data aggregate restored by the fragment data. The fragment data having the identification code is transmitted to a transmission channel. Further, the same transmission channel can be used to transmit the multiple pieces of the fragment data corresponding to the multiple data aggregates. When a receiving party is previously notified of the identification code, it can receive the fragment data by distinguishing which fragment data should restore which data aggregate.

9 Claims, 16 Drawing Sheets

FIG. 4
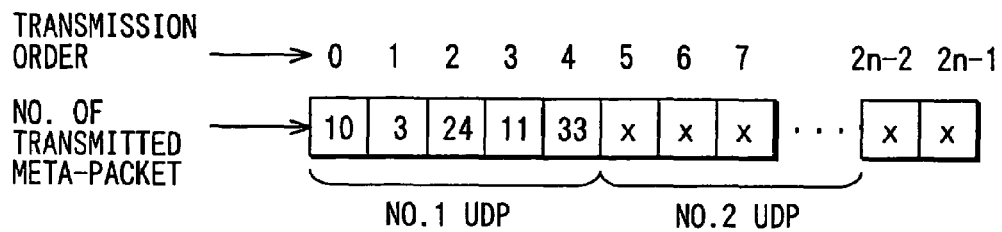
FIG. 5
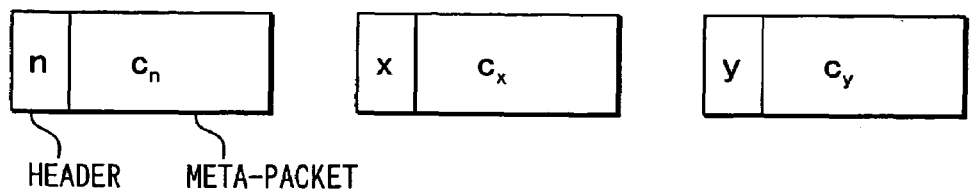
FIG. 6
| TYPE \ CATEGORY | NEWS | SPORTS | TRAFFIC | WEATHER |
|---|---|---|---|---|
| AUDIO (DIGEST) | 10 | 20 | 30 | 40 |
| VIDEO (DETAIL) | 11 | 21 | 31 | 41 |
FIG. 7
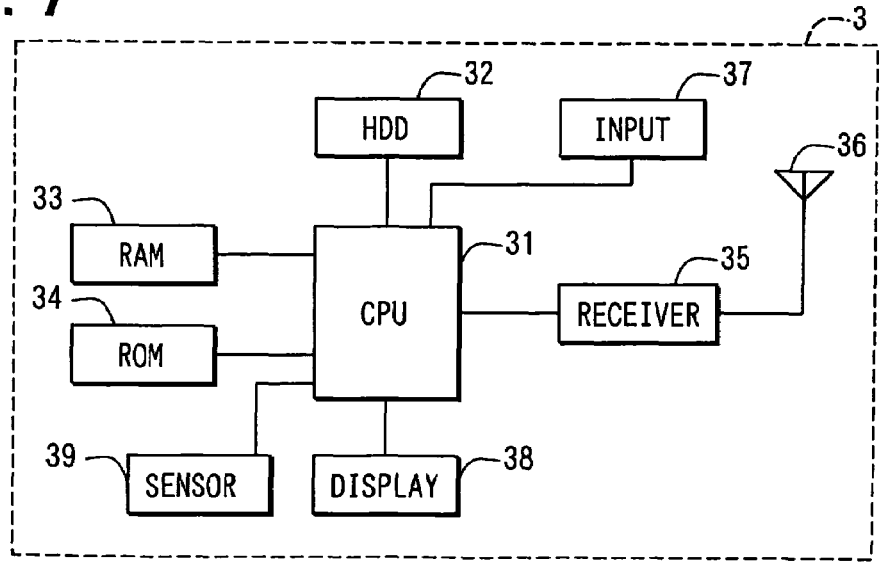

| TYPE \ CATEGORY | NEWS | SPORTS | TRAFFIC | WEATHER | EMERGENCY |
|---|---|---|---|---|---|
| AUDIO (DIGEST) | 10 | 20 | 30 | 40 | 90 |
| VIDEO (DETAIL) | 11 | 21 | 31 | 41 | |

FIG. 21

| CATEGORY | | FREE | | CHARGED | | | | PRIVATE |
|---|---|---|---|---|---|---|---|---|
| | | ADVERTISEMENT | EMERGENCY | NEWS | SPORTS | TRAFFIC | WEATHER | GENERAL |
| FILE ID | AUDIO | 0 | 90 | 10 | 20 | 30 | 40 | SPECIFIC |
| | VIDEO | 1 | | 11 | 21 | 31 | 41 | |
| Ex | | 0 | 0 | 1 (CONTRACTOR ONLY) | 2 (CONTRACTOR ONLY) | 2 (CONTRACTOR ONLY) | 2 (CONTRACTOR ONLY) | SPECIFIC |
| Rx | | 0 | 0 | 1 (CONTRACTOR ONLY) | 2 (CONTRACTOR ONLY) | 2 (CONTRACTOR ONLY) | 2 (CONTRACTOR ONLY) | SPECIFIC |

INFORMATION DISTRIBUTION SYSTEM

CROSS REFERENCE TO RELATED APPLICATIONS

This application is based on and incorporates herein by reference Japanese Patent Application No. 2003-70102 filed on Mar. 14, 2003.

FIELD OF THE INVENTION

The present invention relates to an information distribution system including a server, a reception terminal, a reservation server, and a reservation terminal. In particular, this information distribution system is appropriately used in an application for a vehicle.

BACKGROUND OF THE INVENTION

Conventionally, there has been examined a service of distributing information to vehicles using wireless communication technologies such as wireless LAN and DSRC (Dedicated Short Range Communications).

When the wireless LAN or the DSRC is used, a plurality of vehicles may be serviced within one wireless cell. In such a case, it is necessary to provide as many transmission sessions as services, thus degrading the efficiency of using wireless transmission channels.

A technology to solve this problem is disclosed in patent document 1 (JP-A-2001-189665 or U.S. Pat. No. 6,307,487). This technology outputs a meta-packet from an input file as a data aggregate. Here, the meta-packet is defined as a sequence of fragment data having information independent of each other. FIG. 23 shows relationship between an input file and a meta-packet to be generated. The following description is not a quotation from patent document 1. The inventors reproduced the contents using equations based on technical examinations. An input file 51 is divided into source packets $s_0, s_1, \ldots,$ and $s_{n-1}$ each having a unit data length. A vector comprises these n source packets as components. The vector is multiplied by a coded matrix comprising n+k rows and n columns, where n and k are natural numbers. This multiplication yields a vector comprising n+k components. Each component is a meta-packet.

The coded matrix is formed so that a matrix of $(1+\alpha)n$ rows and n columns extracted from any $(1+\alpha)n$ rows becomes regular. Value $\alpha$ is sufficiently smaller than 1. Accordingly, obtaining the necessary number of meta-packets, i.e., $(1+\alpha)n$ meta-packets makes it possible to restore the input file, i.e., the vector comprising source packets $s_0, s_1, \ldots,$ and $s_{n-1}$. To do this, an inverse matrix comprising $(1+\alpha)n$ rows and n columns is generated by extracting rows corresponding to the obtained meta-packets from the coded matrix. The inverse matrix is then multiplied by a vector comprising the obtained meta-packets. FIG. 24 schematically shows a method of restoring an original input file from the obtained meta-packets.

This technology can be used for the wireless LAN and DSRC. When meta-packets are continuously transmitted in a wireless cell, information can be simultaneously distributed to vehicles that enter and exit from the wireless cell. When entering the wireless cell, a vehicle repeatedly receives transmitted meta-packets until the necessary number of meta-packets is accumulated. When the necessary number of meta-packets is accumulated, an original file can be restored based on the accumulated meta-packets. As mentioned above, any meta-packets can be received only when the necessary number of meta-packets is available. It is unnecessary to adjust the timing to start a service between a service provision party (sender) and a service receiving party (recipient). Even when a plurality of vehicles enters or exists from the wireless cell, each vehicle can complete the reception when the necessary number of meta-packets can be obtained. Therefore, it is unnecessary to provide a session individually.

When the information distribution service is actually provided for vehicles, however, it is not always the best way to distribute the same file to all vehicles in one wireless cell. Information to be distributed may often vary with vehicle's situations such as a traveling speed.

Further, the same transmission channel is used to distribute the information to a plurality of users. Therefore, it is necessary to devise a method of preventing the other users from intercepting the data that should be distributed to a specific user.

Patent document 1 does not disclose a means for solving these situations by using the above-mentioned meta-packet technology.

SUMMARY OF THE INVENTION

The present invention has been made in consideration of the foregoing. It is therefore an object of the present invention to distribute information suitable for vehicle situations by using fragment data, when collected to a required count, capable of restoring a certain data aggregate based on a coded matrix.

To achieve the above object, an information distribution server is provided with the following. Fragment data is generated with respect to a certain data aggregate that is one of a plurality of data aggregates using a coded matrix. The fragment data is capable of restoring the certain data aggregate based on the coded matrix when the fragment data is collected to a required count. The generated fragment data is provided with an identification code associated with the certain data aggregate restored by the fragment data. The fragment data having the identification code is transmitted to a transmission channel.

In this structure, the fragment data is provided with an identification code unique to a certain data aggregate restored by the fragment data. A receiving party can thereby receive the fragment data by distinguishing which fragment data should restore which data aggregate. Further, the same transmission channel is used to transmit a plurality of pieces of the fragment data corresponding to a plurality of data aggregates. As a result, receiving a data aggregate having a large amount of data takes a long time. By contrast, receiving a data aggregate having a small amount of data takes a short time. Accordingly, it is possible to provide the information distribution appropriate to vehicle situations such as its traveling speeds.

In another aspect of the present invention, an information distribution system is provided as including an information distribution server as a first apparatus, a reservation server as a second apparatus, a reservation terminal as a third apparatus, and a reception terminal as a fourth apparatus. In the information distribution server, certain information specifying a data aggregate, an identification code, and a coded matrix is received from the reservation server; Fragment data with respect to the data aggregate specified by the certain information by using the coded matrix specified by the certain information, wherein the fragment data is capable of restoring the data aggregate based on the coded matrix when the fragment data is collected to a required count; the generated fragment data is provided with the identification code specified by the certain information; and the fragment data having the identification code is then transmitted. In the reservation server, a request to transmit the data aggregate is received from the reservation terminal; the certain information specifying the data aggregate, the identification code, and the coded matrix is transmitted to the information distribution server based on reception of the request from the reservation terminal; and given information specifying the identification code and the coded matrix is transmitted to the reservation terminal. In the reservation terminal, the request to transmit the data aggregate is transmitted to the reservation server; the given information specifying the identification code and the coded matrix is received from the reservation server; and the received given information is transmitted to the reception terminal. In the reception terminal, the given information is received from the reservation terminal; the fragment data having the identification code is received from the information distribution server; and the data aggregate is restored from the received fragment data having the identification code based on the coded matrix specified by the received given information.

This structure enables a user to reserve a data aggregate in an information distribution system using a reservation terminal. For instance, when a user reserves a certain data aggregate using the reservation terminal, the reservation terminal transmits a request to receive the certain data aggregate to the reservation server. When receiving the request, the reservation server notifies reservation information including an identification code and a coded matrix to the information distribution server and also to the reception terminal via the reservation terminal. Distributed information of fragment data corresponding to the certain data aggregate can be thereby handed over from the information distribution server to the reception terminal by using the same identification code and the same coded matrix. Accordingly, the information distribution is available to only the reception terminal that is notified of this coded matrix. It is possible to provide the information distribution service that can prevent users other than those authorized from intercepting the distributed information. Further, for instance, the concept of information that specifies the coded matrix includes both the coded matrix itself and information for specifying the coded matrix, e.g., an identification number of the coded matrix.

BRIEF DESCRIPTION OF THE DRAWINGS

The above and other objects, features, and advantages of the present invention will become more apparent from the following detailed description made with reference to the accompanying drawings. In the drawings:

FIG. 4 shows an example of a random number table according to the first embodiment;

FIG. 5 shows a method of adding a header to each meta-packet according to the first embodiment;

FIG. 6 diagrams correspondence between each file type and its associated file ID according to the first embodiment;

FIG. 7 shows a configuration of a reception terminal according to the first embodiment;

FIG. 21 shows relationship among file IDs, coded matrices, random number sequences, and types of files to be distributed according to the fourth embodiment;

DETAILED DESCRIPTION OF THE PREFERRED EMBODIMENTS

First Embodiment

Figure 1:
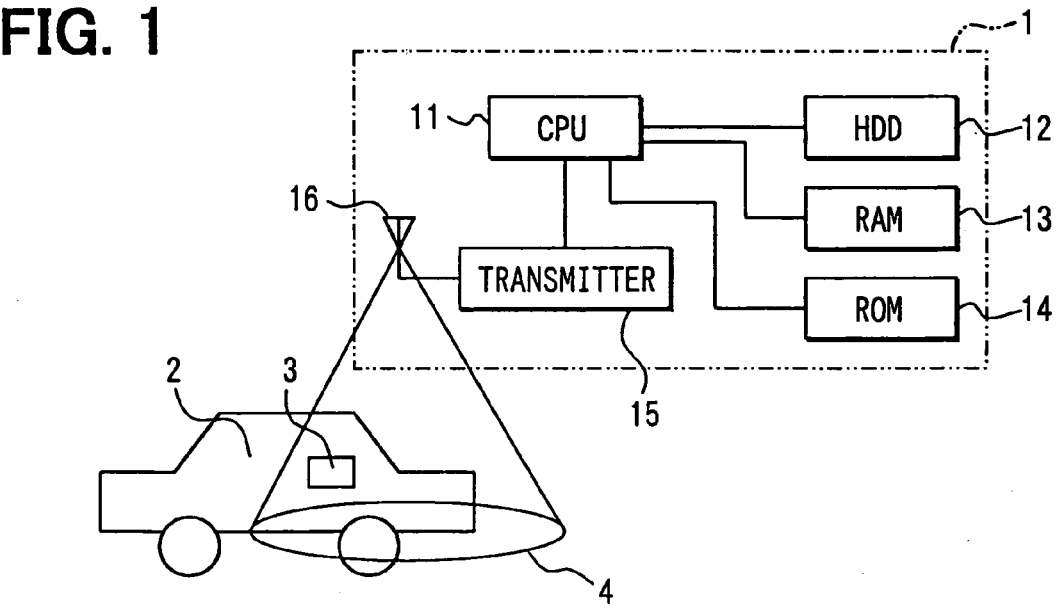
FIG. 1 shows an overview of an information distribution system according to a first embodiment of the present invention.

FIG. 1 shows an overview of the information distribution system according to a first embodiment of the present invention. In the information distribution system according to the embodiment, a meta-packet server 1 functions as an information distribution server. A meta-packet is generated from a file by the meta-packet technology. The meta-packet server 1 transmits this meta-packet to a wireless cell 4. A reception terminal 3 is mounted on a vehicle 2. When the vehicle 2 passes through the wireless cell 4, the reception terminal 3 receives the meta-packet. When the number of received meta-packets reaches a specified value, an original file is restored.

The meta-packet server 1 includes a CPU 11, an HDD 12, RAM 13, ROM 14, a transmitter 15, and an antenna 16.

The CPU 11 reads a program from the ROM 14 and executes the program. The CPU 11 operates on the process contents described in the program. The CPU 11 operates in this manner to appropriately read data from the HDD (hard disk drive) 12, the RAM 13, and the ROM 14. Further, the CPU 11 writes data to the HDD 12 and the RAM 13. During operations, the CPU 11 outputs data to the transmitter 15 as needed.

The transmitter 15 processes data supplied from the CPU 11 in such a manner as modulation, D/A conversion, amplification, and the like. The transmitter outputs the processed signal to the antenna 16.

When supplied with the signal from the transmitter 15, the antenna 16 radiates this signal as a wireless signal within a range of the wireless cell 4.

The transmitter 15 and the antenna 16 are provided outside the meta-packet server 1. They may be connected to the meta-packet server 1 via networks such as the Internet, a dedicated line, and the like.

The following describes a process executed by the CPU 11. The HDD 12 stores files as data aggregates. Some files are predetermined to be distributed to the vehicle 2 while the meta-packet server 1 operates. The CPU 11 detects these files by referencing a file list stored in the HDD 12, for example. The CPU 11 generates a meta-packetization process for each of the detected files as an original data aggregate.

Figure 2:
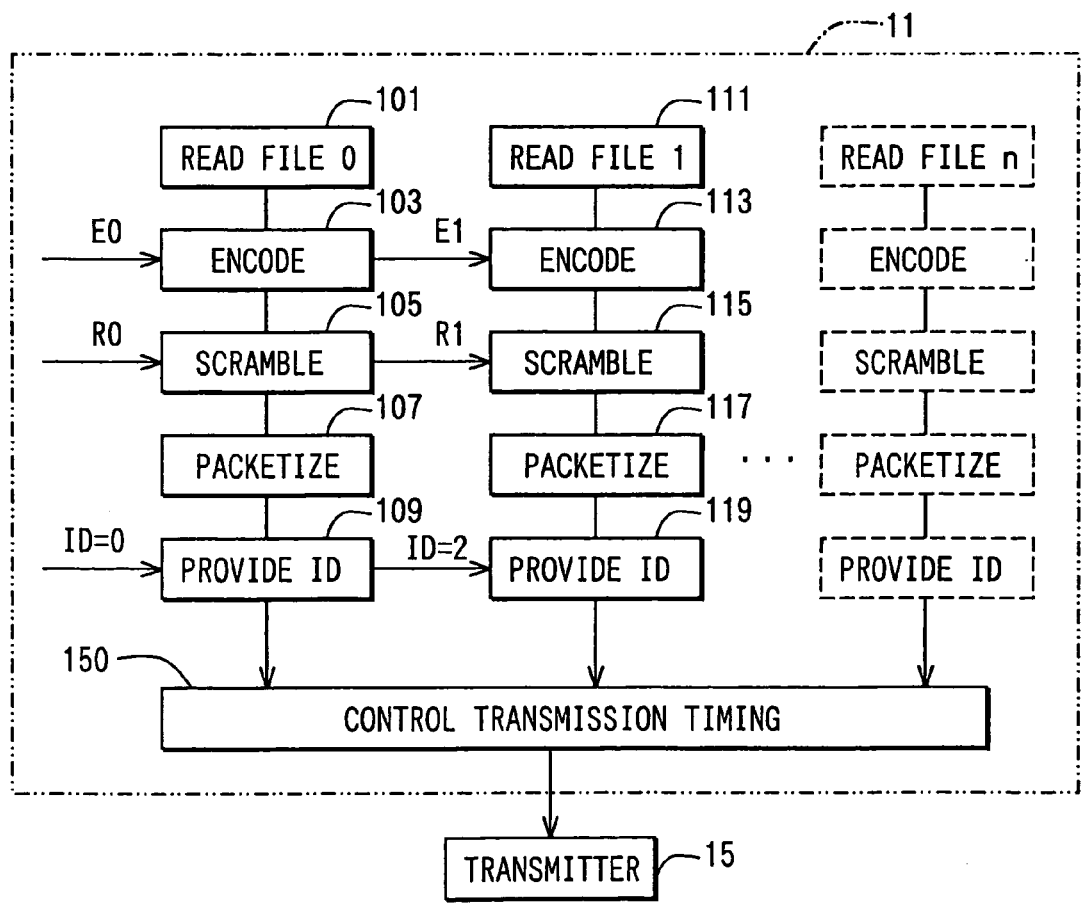
FIG. 2 shows a configuration of a meta-packetization process generated in each file according to the first embodiment.

FIG. 2 shows a configuration of the meta-packetization process generated for each file. In FIG. 2, Steps 101 through 109 constitute a meta-packetization process for file 0, one of files predetermined to be distributed as mentioned above. Likewise, Steps 111 through 119 constitute a meta-packetization process for file 1. For example, these processes can be implemented as a plurality of instances generated from a class in the program read from the ROM 14.

The following describes the meta-packetization process using Steps 101 through 109 as an example. At Step 101, the process reads file 0 from the HDD 12. Specifying a file is, for example, based on an argument passed when the process is generated.

At Step 103, the process divides and encodes the read file. At Step 105, the process scrambles the generated meta-packet. At Step 107, the process packetizes a plurality of meta-packets into a single UDP packet. At Step 109, the process provides a file ID. The file ID is an identification code correspondingly assigned to each file.

Figure 3:
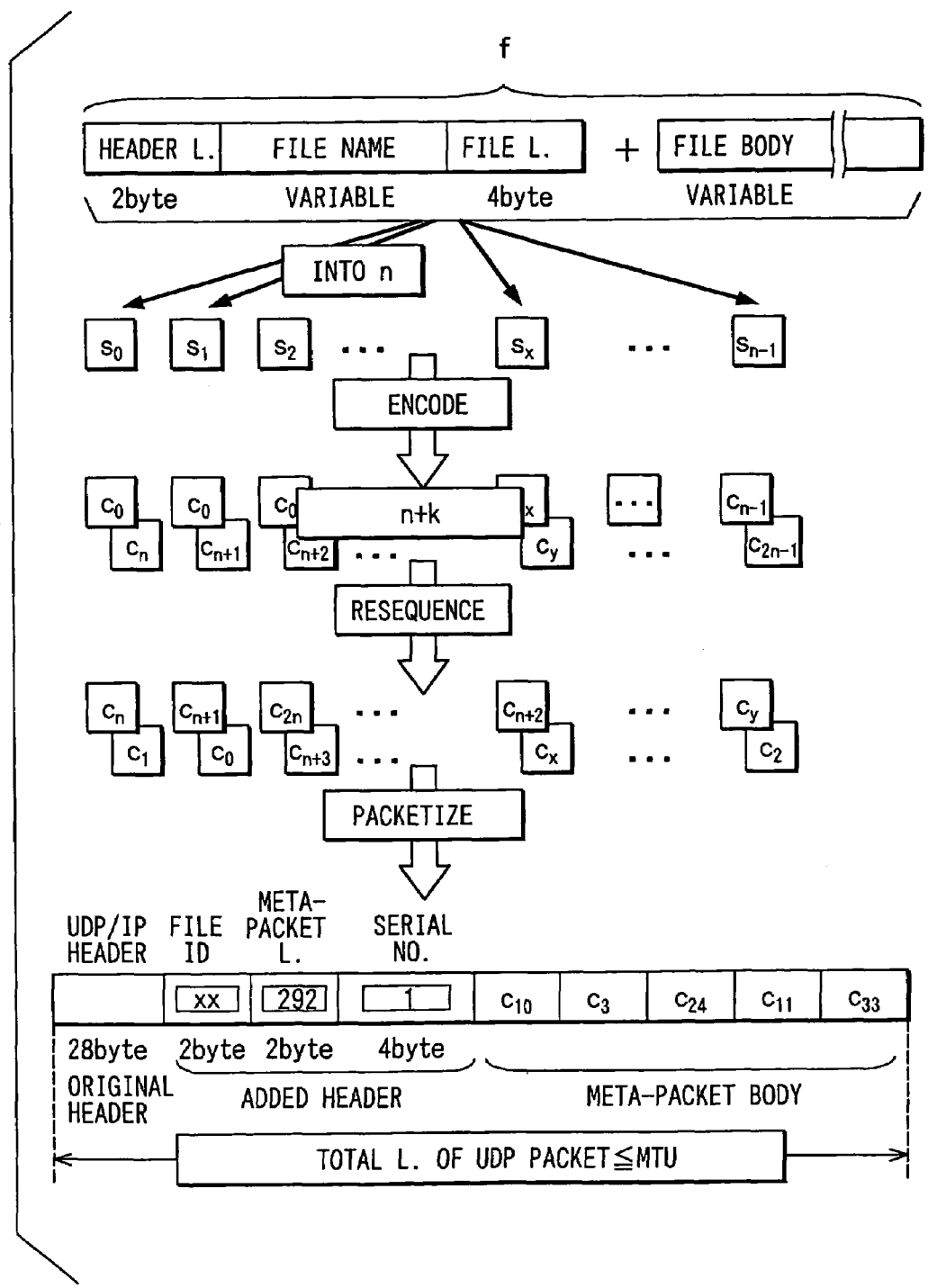
FIG. 3 schematically shows a process of dividing and encoding a file, and providing an ID according to the first embodiment.

FIG. 3 schematically shows the process of dividing and encoding the file, and providing the ID. As shown at the top of FIG. 3, file f comprises a header length, a file name, file length information, and a file body. The file division at Step 103 divides this file f into n source packets $s_0, s_1 \ldots, s_{n-1}$ each having the same length.

An n-component vector comprises the equally divided source packets $s_0, s_1 \ldots,$ and $s_{n-1}$ as data. The file encoding at Step 103 multiplies this n-component vector by a coded matrix comprising n+k rows and n columns, where n and k are natural numbers. The multiplication yields a vector comprising n+k components, i.e., meta-packets $c_0, c_1 \ldots,$ and $c_{2n-1}$. With respect to the multiplication between the coded matrix and the vector comprising source packets, elements of the matrix and the vector are assumed to belong to the Galois field with two elements, GF(2). Specifically, elements of the source packets and the coded matrix are all binary numbers. The multiplication between elements is assumed to be an AND operation. The sum therebetween is assumed to be an XOR operation.

This embodiment uses a Tornado code as the coded matrix. When the Tornado code is used, k=n is assumed. Of 2n meta-packets, $c_0$ through $c_{n-1}$ are equivalent to $s_0$ through $s_{n-1}$, respectively; and $c_{n+1}$, through $c_{2n-1}$ are parity information for $s_0$ through $s_{n-1}$, respectively. The coded matrix used here is already stored in the HDD 12.

The encoding using the Tornado code requires the specified number of meta-packets to restore the information. The number of these meta-packets slightly varies with which meta-packet should be obtained from a sequence of meta-packets. Consequently, a problem may occur when the above-mentioned generated meta-packets are transmitted with their sequence unchanged. That is to say, there may be a remarkable difference between an early completed restoration and a late completed restoration due to reception timings of a party that receives meta-packets.

To solve this problem, the embodiment scrambles the meta-packets $c_0, c_1$, and so on to resequence them at Step 105. The scrambling is performed based on a random number table (random number sequence) already stored in the HDD 12. Here, the random number table includes a random number sequence by which a randomized sequence is generated from an original sequence with a one-to-one correspondence between them. FIG. 4 shows an example of the random number table. In this random number table, values ranging from 0 to n+k−1 are subscript numbers for the meta-packets and are hereafter referred to as meta-packet numbers. The random number table is an approximately random mapping table. The random number table provides one-to-one mapping between the range of values from 0 to n+k−1 and the range of values from 0 to n+k−1 (transmission sequence). When meta-packets are generated, $c_{j-1}$ is the jth meta-packet ($1 \leq j \leq n+k$). The $c_{j-1}$ meta-packet is changed to an ordinal position resulting from adding 1 to the transmission sequence value corresponding to the meta-packet number j−1 in the random number table. In this manner, the scrambling using the random number table can average the amount of computation needed for decoding independently of reception timings.

At Step 107, the UDP packetization stores a plurality of scrambled meta-packets in one UDP packet u. Here, two methods of storing meta-packets are available.

One method is to store a meta-packet by attaching a header (see FIG. 5). The header indicates what number is assigned to each meta-packet generated in a sequence. In this case, a mere reference to the header can make it possible to determine what number is assigned to the corresponding meta-packet. However, attaching the header increases the amount of information to be stored in a UDP packet, thus degrading the transmission efficiency.

The other method is to store meta-packets in a UDP packet without attaching the above-mentioned headers. The UDP packet's header is provided with a UDP packet sequence number to indicate the order of generating UDP packets. According to this method, the header just needs to be attached to each UDP packet that stores a plurality of meta-packets. This makes it possible to minimize an increase in the amount of information and improve the transmission efficiency. In this case, however, only UDP packets can be used to identify what number is assigned to the stored meta-packet. The receiving party also needs to use the same random number table as that used for the meta-packet server 1. The file restoration in this case will be described later. The embodiment uses the latter method.

The above-mentioned process generates meta-packets based on file 0.

Each of the above-mentioned meta-packetization processes generates meta-packets based on the corresponding file. The bottom part of FIG. 3 shows the configuration of the UDP packet generated in this method. It is a good practice to include as many meta-packets as possible in one UDP packet so that the UDP packet should not exceed the predetermined MTU (Max Transfer Unit, e.g., 1496). This can improve the information transmission efficiency.

While the file ID is provided at Step 109, the file ID is provided for each UDP like the UDP packet as shown at the bottom of FIG. 3. FIG. 6 shows correspondence between each file type and its associated file ID according to the embodiment. Files transmitted from the meta-packet server 1 are classified into a plurality of categories such as topical news, sports, traffic information, and weather forecast. Each category is provided with digest information and detailed information. The digest information uses an audio file. The detailed information uses a video file. The file ID is a 2-digit decimal number. In each category, the same value is assigned to the second digit of the file IDs for audio and video files. In this manner, categories can be distinguished from each other by using the same digit of the file IDs for audio and video files in the same category.

After meta-packets are generated from the respective files, a transmission timing control process 150 transmits the meta-packets at the same density. The transmission timing control process 150 differs from the above-mentioned meta-packetization process. The transmission timing control process 150 allows the transmitter 15 to transmit meta-packets at almost the same frequency for each file as an origin of the meta-packets. For example, let us assume that the meta-packet server 1 distributes eight types of files as shown in FIG. 6. Further, let us focus on meta-packets transmitted from the meta-packet server 1 within a specified time. In this case, the transmission timing control process 150 functions so that meta-packets originated from each file can occur with a probability of one eighth respectively.

The transmission timing control process 150 can be implemented as a task scheduling process that manages timing to perform each meta-packetization process with an equal priority. The transmission timing control process 150 can also be implemented as a process to receive meta-packets from each meta-packetization process. Here, the transmission timing control process 150 outputs the received meta-packets to the transmitter 15. At this time, the meta-packets are configured to be output in such an order as to maintain almost the same frequency of occurrence corresponding to the meta-packetization process.

After output to the transmitter 15, the meta-packets are transmitted from the antenna 16 to the wireless cell 4.

FIG. 7 shows a configuration of the reception terminal 3 according to the embodiment. The reception terminal 3 comprises a CPU 31, an HDD 32, RAM 33, ROM 34, a receiver 35, an antenna 36, an input apparatus 37, and a display apparatus 38.

The input apparatus 37 is provided with a button, a touch panel, a switch, and the like. When a user operates these parts, the input apparatus 37 outputs a signal based on the user operation to the CPU 31.

The display apparatus 38 comprises a display and a speaker. The display displays videos and characters based on video signals supplied from the CPU 31. The speaker outputs a sound based on an audio signal supplied from the CPU 31.

The CPU 31 reads a program from the ROM 34 and executes the program. The CPU 31 operates on the process contents described in the program. The CPU 31 operates in this manner to appropriately read information from the HDD 32, RAM 33, and the ROM 34. Further, the CPU 31 writes information to the HDD 32 and the RAM 33. During operations, the CPU 31 appropriately interchanges signals with the receiver 35. The CPU 31 outputs video and audio signals to the display apparatus 38. Further, the CPU 31 is supplied with signals from the input apparatus 37.

Figure 8:
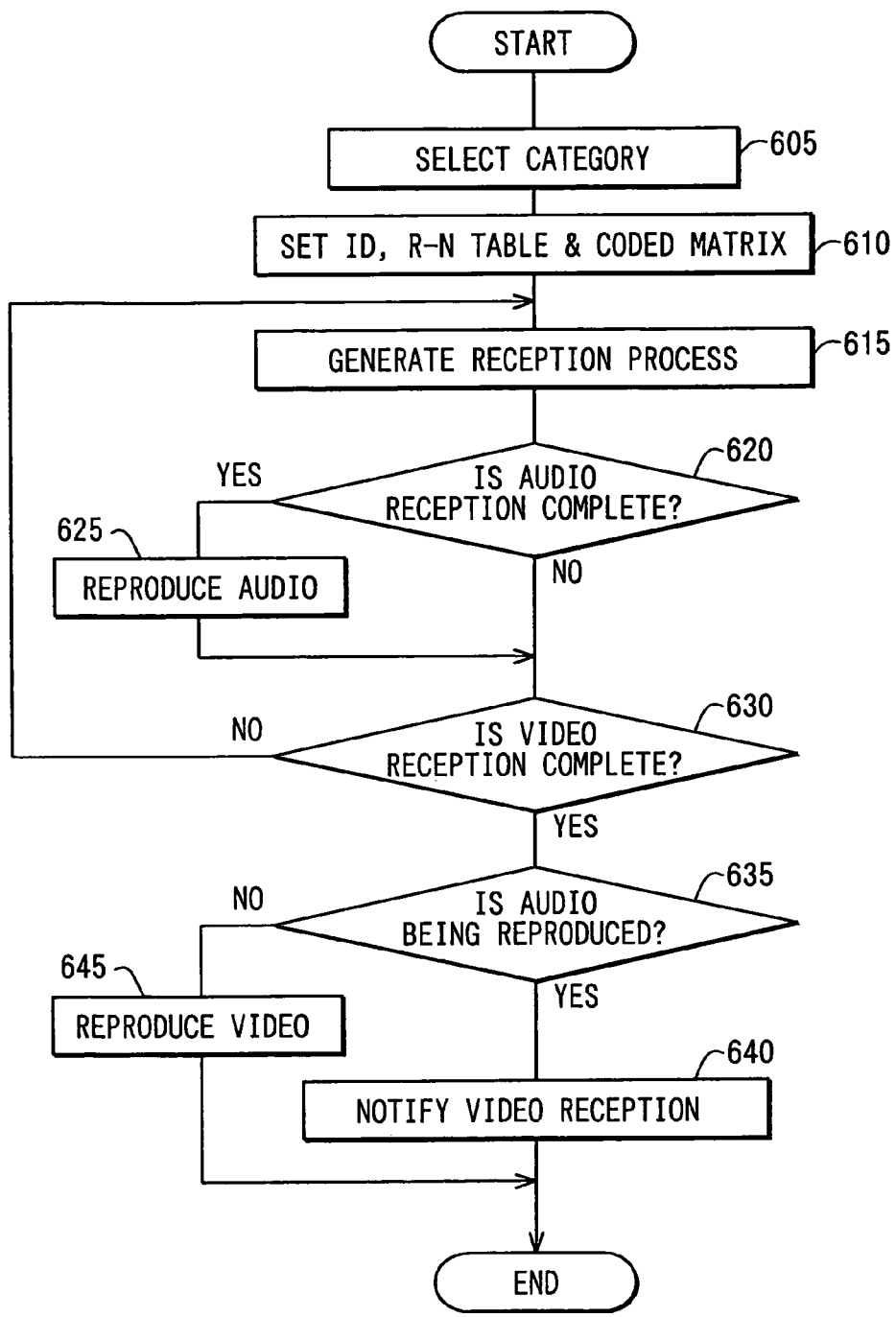
FIG. 8 is a flowchart showing a process of a CPU according to the first embodiment.

The following describes operations of the CPU 31. When the reception terminal 3 is powered, a user operates the input apparatus 37 to request information distribution. The input apparatus 37 outputs the corresponding signal to the CPU 31. Based on the input signal, the CPU 31 starts the process as shown in FIG. 8.

At Step 605, the process outputs video and audio signals to the display apparatus 38 to prompt the user to select a category the user wants to receive. Then, the process accepts a user input from the input apparatus 37.

When the user selects a category the user wants to receive, the input apparatus 37 supplies a signal corresponding to the user selection. Then, the process advances to Step 610 to determine a file ID, a random number table, and a coded matrix for a category corresponding to the input. When the selected category is traffic information, the IDs are set to 30 and 31. Random number tables R31 and R32 are selected correspondingly. Further, coded matrices E31 and E32 are selected correspondingly.

At Step 615, the process generates a new process, when not generated, to receive meta-packets for the category.

At Step 620, the process inquires the above-mentioned reception process to determine whether or not the audio signal reception is complete. When the audio signal reception is complete, the process advances to Step 625 only immediately after completion of the audio signal reception, the process generates an audio reproduction process. The process then advances to Step 630. The state immediately after completion of the audio signal reception must satisfy the following two conditions. Firstly, the reception process generated at Step 615 had received the necessary number of meta-packets at Step 620 for the previous occurrence of the process. Secondly, the reception of the meta-packets is already complete at Step 620 for the current process.

When the audio signal reception is not complete, the process advances to Step 630. The process inquires the above-mentioned reception process to determine whether or not the video signal reception is complete. When the video signal reception is not complete, the process returns to Step 615.

When the video signal reception is complete, the process advances to Step 635. The process determines whether or not an audio reproduction process is executed to determine whether or not the audio is being reproduced. When the audio is not reproduced, the process advances to Step 645. The process generates a process to reproduce a completely received video, and then terminates. When the audio is being reproduced, the process advances to Step 640 to notify the user that the video has been received successfully. The process then prompts the user to determine whether or not to reproduce the video at the user's discretion. For this purpose, the process outputs associated video and audio signals to the display apparatus 38. The process then terminates.

Figure 9:
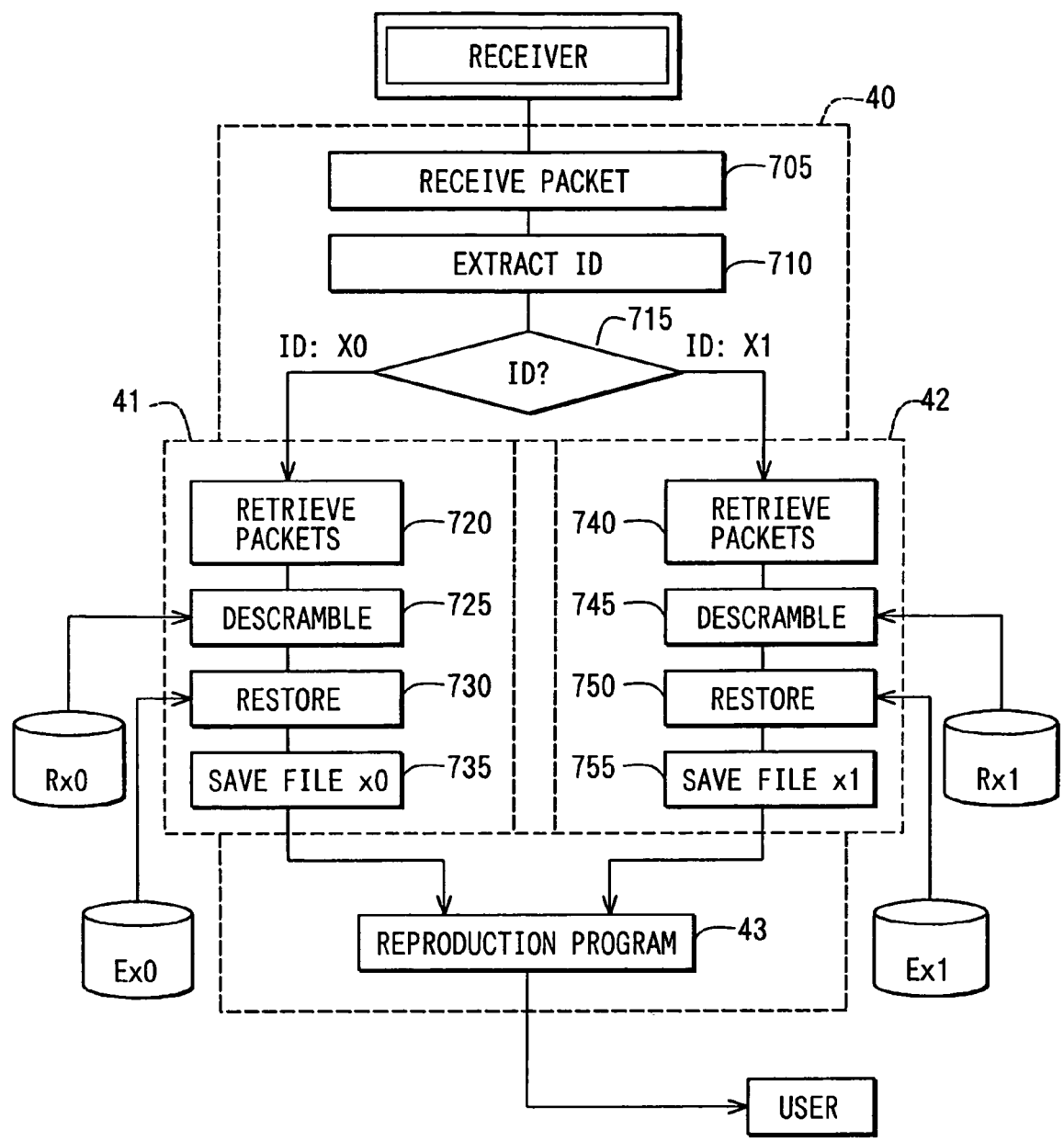
FIG. 9 is a diagram showing a process of reproducing a meta-packet, and audio and video signals according to the first embodiment.

FIG. 9 shows a configuration of processes to receive meta-packets generated at Step 615 in FIG. 8 and to reproduce audio and video signals generated at Steps 625 and 645.

The process generated at Step 615 is a packet classification process 40. This process repeatedly performs Steps 705, 710, and 715 sequentially in FIG. 9. At Step 705, the process is supplied with a UDP packet containing meta-packets the receiver 35 receives. At Step 710, the process reads a file ID from the supplied UDP packet. That is to say, this process extracts the file ID information.

It is assumed that the extracted file ID is equivalent to that set at Step 610. At Step 715, the process generates a decode process, when not generated, corresponding to the file ID. The file ID is then passed to the decode process.

For example, an audio decode process 41 and a video decode process 42 are generated at Step 715. The UDP packet is passed to these processes.

At Step 720, the audio decode process 41 sequentially retrieves UDP packets having the file ID passed from the packet classification process 40. The UDP packets to be retrieved are already received by the packet classification process 40. When the number of received meta-packets reaches a required count, the process advances to Step 725. The required count is predetermined and depends on the type of coded matrix to be used. For the Tornado code, for example, the required count is obtained by multiplying the number of source packets by $(1+\alpha)$, where $\alpha$ is greater than or equal to 0.05. The value $\alpha$ is an index called the redundancy.

At Step 725, the process reads a specific one of a plurality of random number tables already stored in the HDD 32. That is to say, the process reads random number table Rx0 corresponding to the file ID for audio files determined at Step 610 in FIG. 8. In this example, the process reads random number table R30 corresponding to file ID 30. The correspondence between each file ID and its associated random number table is consistently predefined between the meta-packet server 1 and the reception terminal 3. The reception terminal 3 uses the program that stores the correspondence information. The process specifies individual meta-packet numbers based on random number table Rx0. Specifically, the UDP packet contains a packet sequence number. The process specifies ordinal positions of individual transmitted meta-packets according to that packet sequence number and ordinal positions of the meta-packets in the UDP packet. The process retrieves a meta-packet number corresponding to the ordinal position from random number table Rx0. The retrieved value is assumed to be the number of the meta-packet. The meta-packets are rearranged in the ascending order of these numbers.

At Step 730, the process restores the file using coded matrix Ex0. Specifically, the process reads a specific one of a plurality of code matrices already stored in the HDD 32. That is to say, the process reads coded matrix Ex0 corresponding to the file ID for audio files determined at Step 610 in FIG. 8. In this example, the process reads coded matrix E30 corresponding to file ID 30. The correspondence between each file ID and its associated coded matrix, like the random number table, is consistently predefined between the meta-packet server 1 and the reception terminal 3. The reception terminal 3 uses the program that stores the correspondence information. From coded matrix Ex0, the process extracts rows corresponding to the meta-packet numbers specified at Step 725. The extracted rows are used to form a matrix that is then transformed to inverse matrix. The inverse matrix is multiplied by the row vector comprising the meta-packets rearranged at Step 720. As a result, vectors are generated. Elements of these vectors are sequentially connected to form the original file. In this manner, the original file is restored.

At Step 735, the restored file is saved on the HDD 32.

The video decode process 42 functions the same as the audio decode process 41 with some exceptions. One exception is to use random number table Rx1 for a video file received during a descramble process (Step 745). Another exception is to use coded matrix Ex1 for a decoding and file restoration process (Step 750). As a result, a video file is saved on the HDD 32.

A reproduction program 43 is the process generated at Steps 625 and 645 in FIG. 8. The reproduction program 43 reads the audio and video files saved on the HDD 32 by the decode processes such as the audio decode process 41 and the video decode process 42. The reproduction program 43 outputs an audio signal and a video signal from these files to the display apparatus 38.

The above-mentioned information distribution system uses the digest information and the detailed information. The digest information is relatively small-size information such as audio data. The detailed information is relatively large-size information such as video data. The meta-packet server 1 provides these two types of information with different IDs. The meta-packet server 1 then transmits the two types of information as meta-packets to a wireless cell as the same transmission channel. Therefore, the reception terminal 3 can distinctively receive and decode a plurality of files to be decoded using the IDs.

The reception terminal 3 can finish receiving audio data in a short time because its file size is small. By contrast, it takes a long time to finish receiving video data because its file size is large. Let us consider a case where a vehicle having the reception terminal 3 moves fast. In this case, the vehicle stays in the wireless cell in a short period of time. Accordingly, only the audio data can be received. On the other hand, a vehicle user does not have enough time to watch the video while driving. Just being able to listen to the audio can suffice the user. When the vehicle moves slowly, e.g., in case of traffic congestion, the vehicle user can have time to watch the video. In this case, the vehicle stays long in the wireless cell. The reception terminal 3 can receive not only audio data, but also video data. Therefore, it is a good practice to distribute a plurality of contents with different lengths to the same transmission channel. This makes it possible to perform the information distribution appropriate to vehicle speeds.

Second Embodiment

The following describes the information distribution system as a second embodiment of the present invention. The information distribution system according to this embodiment comprises the meta-packet server 1 and one or more reception terminals 3. The configuration and operations of the meta-packet server 1 are the same as those for the first embodiment. The hardware configuration of the reception terminal 3 is basically the same as that for the first embodiment as shown in FIG. 7 with some exceptions. The CPU 31 receives a vehicle speed pulse signal from a vehicle speed sensor 39 mounted on the vehicle. As will be discussed in more detail below, the use of this vehicle sensor characterizes the reception terminal 3 according to the embodiment. Based on a vehicle's traveling (moving) speed, the reception terminal 3 determines to select a file for digest information or detailed information to be received.

Figure 10:
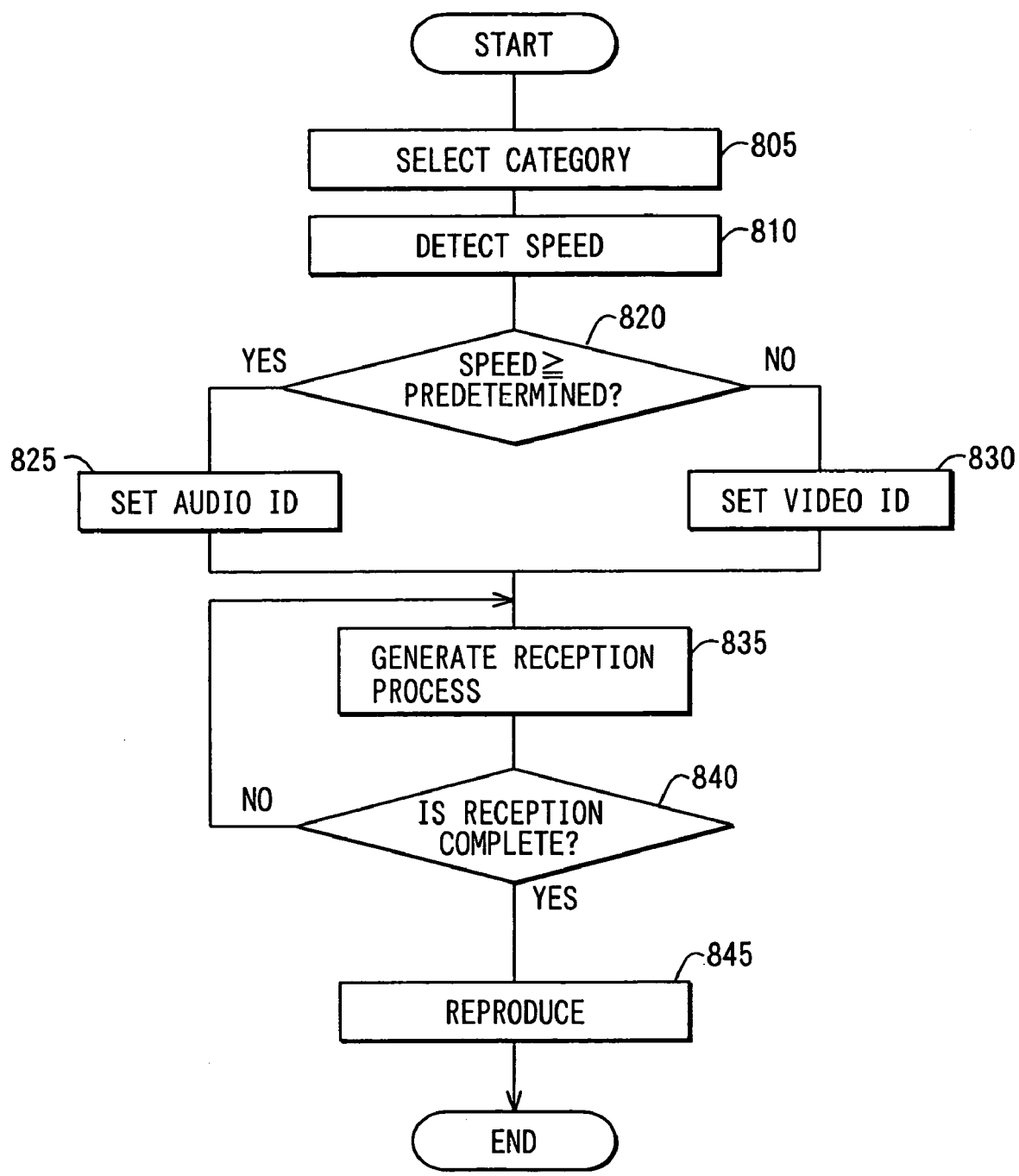
FIG. 10 is a flowchart showing a process of the CPU according to a second embodiment.

The CPU 31 of the reception terminal 3 according to the embodiment operates as follows. When the reception terminal 3 is powered, a user operates the input apparatus 37 to request information distribution. The input apparatus 37 outputs the corresponding signal to the CPU 31. Based on the input signal, the CPU 31 starts the process as shown in FIG. 10.

At Step 805 like Step 605 in FIG. 8, the process outputs video and audio signals to the display apparatus 38. This prompts the user to select a category the user wants to receive. Then, the process accepts a user input from the input apparatus 37.

At Step 810, the process detects the vehicle's speed based on a supplied vehicle speed pulse signal.

At Step 820, the process determines whether or not the vehicle speed is greater than or equal to a reference value. The predetermined reference value is already recorded in the HDD 32.

When the vehicle speed is greater than or equal to the reference value, an audio ID is set at Step 825. More specifically, the process specifies the audio file ID of the category selected at Step 805, the random number table, and the coded matrix corresponding to the ID.

When the vehicle speed is smaller than the reference value, a video ID is set at Step 830. More specifically, the process specifies the video file ID of the category selected at Step 805, the random number table, and the coded matrix corresponding to the ID.

After Step 825 or 830, the process generates at Step 835 a new process, when not generated, to receive meta-packets for the category.

At Step 840, the process inquires the above-mentioned reception process to determine whether or not the signal reception is complete. When the reception is incomplete, the process returns to Step 835. When the reception is complete, the process advances to Step 845 to generate a process to reproduce the received audio or video signal.

Figures 11, 12:
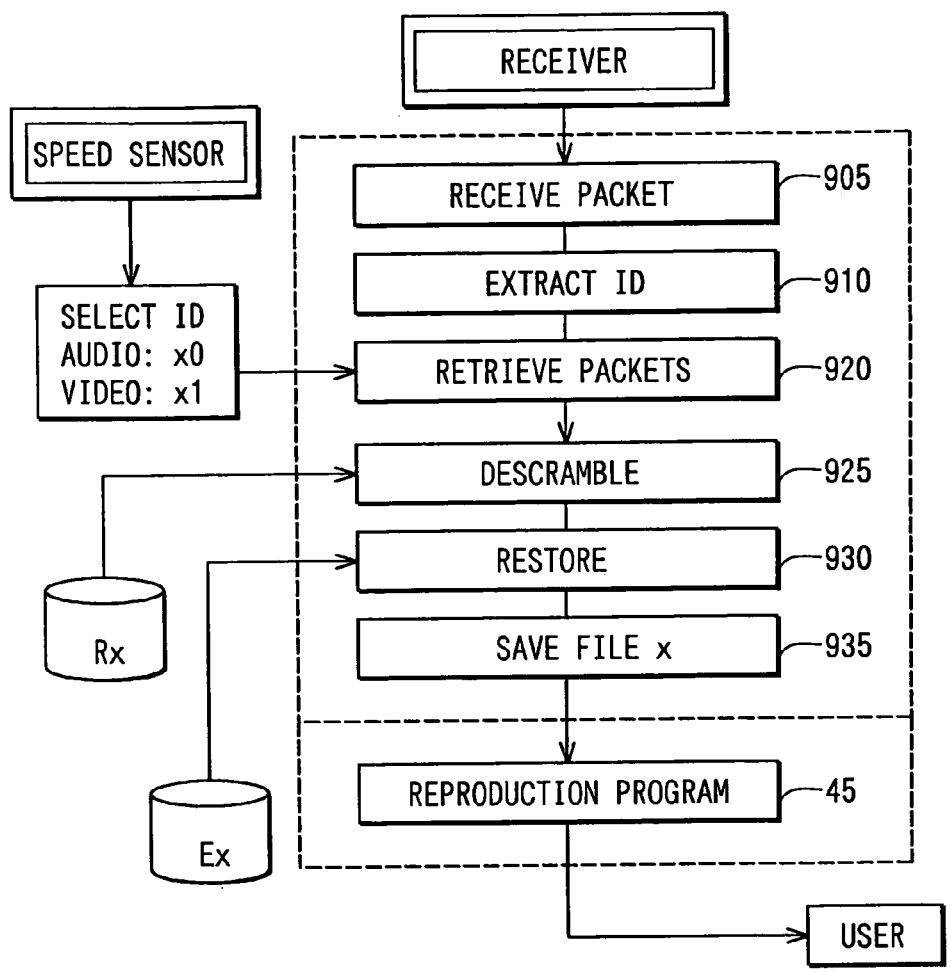
FIG. 11 is a diagram showing a process of reproducing a meta-packet, and audio and video signals according to the second embodiment.
FIG. 12 diagrams correspondence between each file type and its associated file ID according to a third embodiment.

FIG. 11 shows a configuration of processes to receive meta-packets generated at Step 835 in FIG. 10 and to reproduce audio and video signals generated at Step 845.

The reception process generated at Step 835 performs Steps 905 through 935 in FIG. 11. At Step 905, the process is supplied with a UDP packet containing meta-packets the receiver 35 receives. At Step 910, the process reads a file ID from the supplied UDP packet. That is to say, this process extracts the file ID information.

When the extracted ID is the same as that specified at Step 825 or 830, the process takes a meta-packet out of the UDP packet at Step 920. The process then passes the meta-packet to the process at Step 925. The process at Step 925 receives meta-packets from the process at Step 920. When the number of received meta-packets reaches the required count, the process reads the random number table Rx corresponding to the ID. The random number table Rx is stored in the HDD 32. Like Steps 725 and 745, the process specifies individual meta-packet numbers based on the random number sequence. Like Steps 730 and 750 in FIG. 9, the process restores the file from the meta-packets using the coded matrix Ex at Step 930. At Step 935, the restored file is saved on the HDD 32.

A reproduction program 45 is the process generated at Step 845. The reproduction program 45 reads the audio and video files saved on the HDD 32 by the above-mentioned reception process. The reproduction program 45 outputs an audio signal and a video signal from these files to the display apparatus 38.

The information distribution system operates as mentioned above and uses the digest information and the detailed information. The digest information is relatively small-size information such as audio data. The detailed information is relatively large-size information such as video data. The meta-packet server 1 provides these two types of information with different IDs. The meta-packet server 1 then transmits the two types of information as meta-packets to the same wireless cell, i.e., a transmission channel. Therefore, the reception terminal 3 can distinctively receive and decode a plurality of files to be decoded using the IDs.

When the vehicle speed is greater than or equal to the reference value, the reception terminal 3 receives audio data having a relatively small file size. When the vehicle speed is smaller than the reference value, the reception terminal 3 receives video data having a relatively large file size. Let us consider a case where a vehicle having the reception terminal 3 moves fast. In this case, the vehicle stays in the wireless cell in a short period of time. Accordingly, only the audio data can be received. On the other hand, a vehicle user does not have enough time to watch the video while driving. Just being able to listen to the audio can suffice the user. When the vehicle moves slowly, e.g., in case of traffic congestion, the vehicle user can have time to watch the video. In this case, the vehicle stays long in the wireless cell. The reception terminal 3 can receive not only audio data, but also video data. Therefore, it is a good practice to distribute a plurality of contents with different lengths to the same transmission channel. This makes it possible to perform the information distribution appropriate to vehicle speeds.

Third Embodiment

The following describes the information distribution system as a third embodiment of the present invention. The information distribution system according to this embodiment comprises the meta-packet server 1 and one or more reception terminals 3. The configuration and operations of the meta-packet server 1 are the same as those for the first embodiment. According to the third embodiment, however, emergency information is further added to the categories of files transmitted from the meta-packet server 1. A table in FIG. 12 shows correspondence between each file type and its associated file ID according to the embodiment. As seen from the table, an emergency information category corresponds to only file ID 90. This is an audio file for the emergency information. The emergency information includes accident information, disaster information, and the like that need to be immediately transmitted to the vehicle occupant only when the emergency information is available, the meta-packet server 1 transmits meta-packets of the file with ID 90.

The hardware configuration of the reception terminal 3 is the same as that of the reception terminal 3 according to the first embodiment. When the meta-packet server 1 transmits meta-packets for file ID 90, the reception terminal 3 according to the third embodiment temporarily stops receiving the other files if any. The reception terminal 3 then receives this emergency information.

Figure 13:
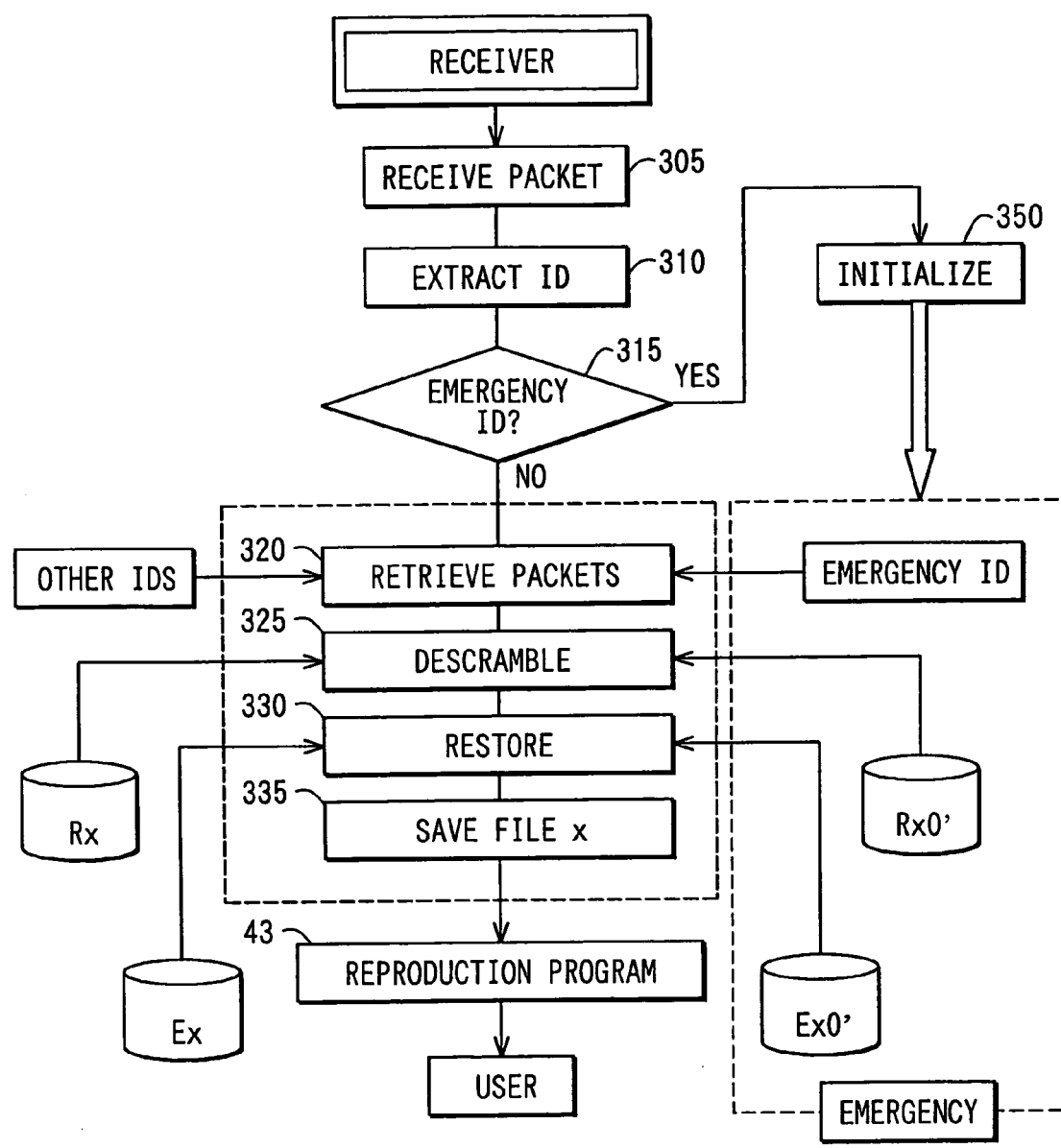
FIG. 13 shows a process executed by the CPU of the reception terminal according to the third embodiment.

The reception terminal 3 performs a process for this purpose. FIG. 13 shows this process. Steps 305 and 310 in FIG. 13 are equivalent to Steps 705 and 710 of the process for the CPU 31 in FIG. 9.

In addition to the determination of file ID at Step 715, the process determines at Step 315 whether or not the received UDP packet contains file ID 90 indicating the emergency information. That is to say, the process determines whether or not the meta-packet server 1 transmits an emergency information file. When the reception terminal 3 does not receive the UDP packet having the file ID indicating the emergency information, the process is executed at Steps 320, 325, 330, and 335. These steps are equivalent to Steps 720, 725, 730, and 735 of the audio decode process 41 in FIG. 6.

When the reception terminal 3 does not receive the UDP packet having the file ID indicating the emergency information, a process is generated for a block initialization module 350. The block initialization module temporarily initializes the process at Steps 320 through 350. That is to say, the block initialization module destroys the meta-packets that have been accumulated so far. The block initialization module changes the contents of the file ID used for retrieving coded data at Step 320, the random number sequence Rx read at Step 325, and the coded matrix Ex read at Step 330. To change the contents, the block initialization module rewrites the associated areas in the RAM 33 that stores these contents. This process allows the process at Steps 320 through 335 to forcibly receive and restore the emergency information file.

This technique is useful for the following situation. Let us consider a case where an accident occurs near the place of information distribution. There is a need to distribute emergency information notifying that the road is closed, for example. The transmitting party stops distributing general information, i.e., information other than the emergency information, and transmits only information having the emergency information ID. When receiving a UDP packet containing the emergency information ID, the receiving party temporarily initializes the receiving and decoding processes so far. The receiving party restarts the information reception using a file ID, random number table Rx0', and coded matrix Ex0' for the emergency information. In this manner, it is possible to reliably transmit information with impending emergency in addition to the effects of the first embodiment.

Fourth Embodiment

Figure 14:
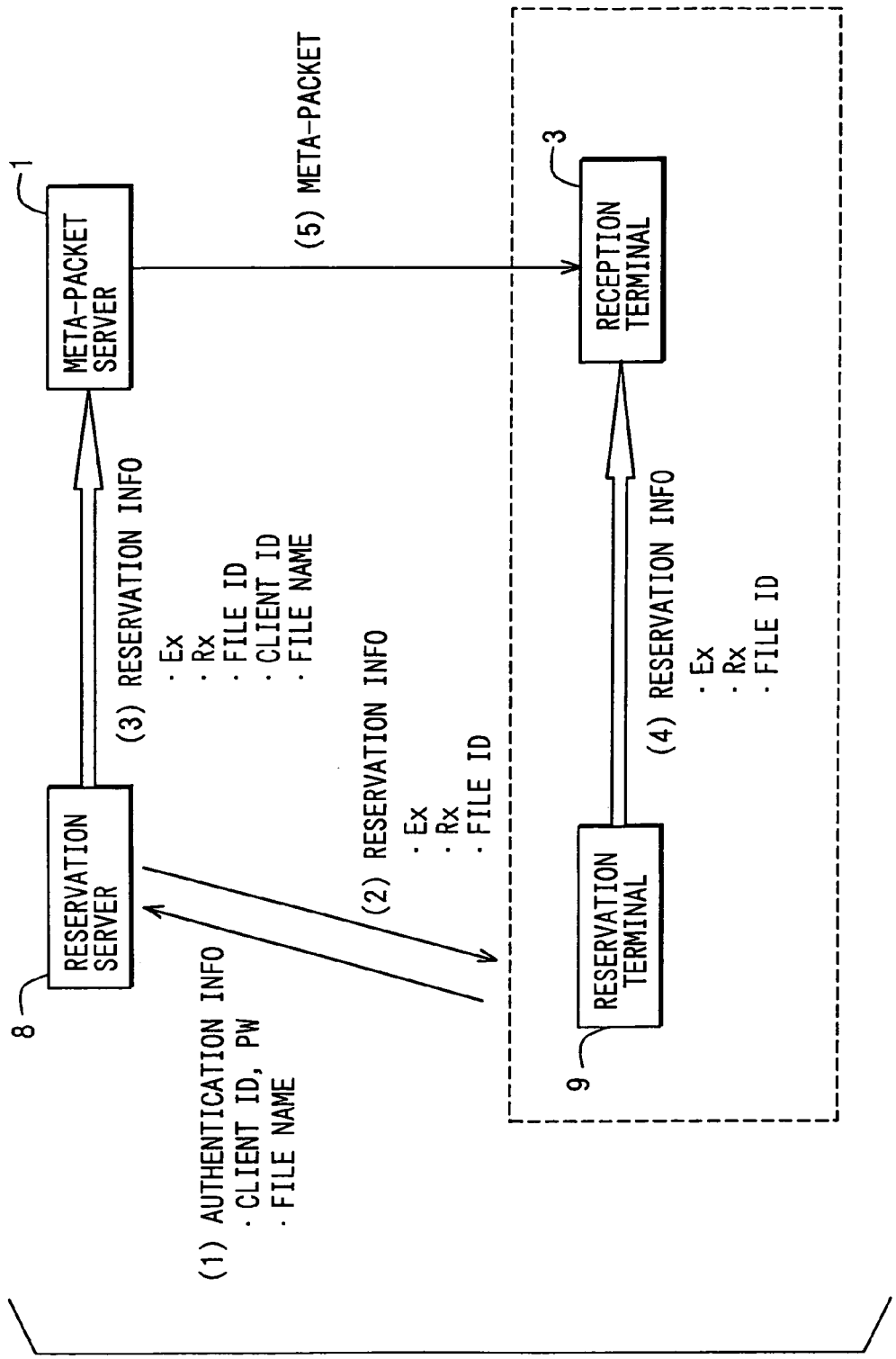
FIG. 14 shows an overview of the information distribution system according to a fourth embodiment.

FIG. 14 shows an overview of the information distribution system according to a fourth embodiment of the present invention. The information distribution system comprises the meta-packet server 1, the reception terminal 3, a reservation server 8, and a reservation terminal 9.

In addition to the hardware configuration in FIG. 1 for the first embodiment, the meta-packet server 1 has an antenna and a transmitter-receiver for communication with the reservation server 8.

The reception terminal 3 is mounted on a vehicle. In addition to the hardware configuration in FIG. 7 for the first embodiment, the reception terminal 3 has a wired or wireless communication apparatus for communication with the reservation terminal 9.

The reservation server 8 has a CPU, RAM, ROM, an input apparatus, a display apparatus, an antenna, a receiver, and the like resembling those shown in FIG. 7 for the first embodiment. However, the antenna and the receiver are configured to be able to communicate with the meta-packet server 1 and the reservation terminal 9.

The reservation terminal 9 has a CPU, RAM, ROM, an input apparatus, a display apparatus, an antenna, a receiver, and the like resembling those shown in FIG. 7 for the first embodiment. However, the antenna and the receiver are configured to be able to communicate with the reservation server 8. In addition to the above-mentioned configuration, the reservation terminal 9 has a wired or wireless communication apparatus for communication with the reception terminal 3. The reservation terminal 9 and the reservation server 8 may be directly connected to each other via a wire. Alternatively, they may connect to each other via a communication line such as the Internet.

The information distribution system having this configuration operates as follows in response to user operations on the reception terminal 3 and the reservation terminal 9. The reservation terminal 9 requests a file from the reservation server 8 in advance. The reservation server 8 transmits information about the requested file to the meta-packet server 1. Afterward, a vehicle mounted with the reception terminal 3 enters the cell where meta-packets are transmitted from the meta-packet server 1. Then, the vehicle receives meta-packets for the file transmitted from the meta-packet server 1 and restores that file.

For the purpose of the above-mentioned operations, the meta-packet server 1, the reception terminal 3, the reservation server 8, and the reservation terminal 9 interchange necessary information as follows.

(1) The reservation terminal 9 transmits client IDs, passwords, and the name of a file to be requested to the reservation server 8. The client IDs and passwords are used as authentication information to specify the reservation terminal 9 and the reception terminal 3.

(2) The reservation server 8 transmits reservation information to the reservation terminal 9. The reservation information includes a file ID as an identification code for the requested file; the random number table Rx (or information to specify the same) to be used for descrambling the file; and the coded matrix Ex (or information to specify the same) to be used for decoding.

(3) The reservation server 8 transmits reservation information to the meta-packet server 1. The reservation information includes the file name and the file ID of the requested file; the random number table Rx (or information to specify the same) to be used for scrambling the file; the coded matrix Ex (or information to specify the same) to be used for meta-packet generation; and the client ID to specify the reservation terminal 9 and the reception terminal 3.

(4) The reservation terminal 9 transmits the random number table Rx (or information to specify the same), the coded matrix Ex (or information to specify the same), and the file ID received from the reservation server 8 to the reception terminal 3.

(5) The reception terminal 3 restores meta-packets for the file transmitted from the meta-packet server 1. The restoration uses the file ID, the coded matrix Ex, and the random number table Rx received from the reservation terminal 9. The coded matrix Ex and the random number table Rx may be specified otherwise.

The following describes functions of the meta-packet server 1, the reception terminal 3, the reservation server 8, and the reservation terminal 9 for the information distribution system that performs the above-mentioned operations.

Figure 15:
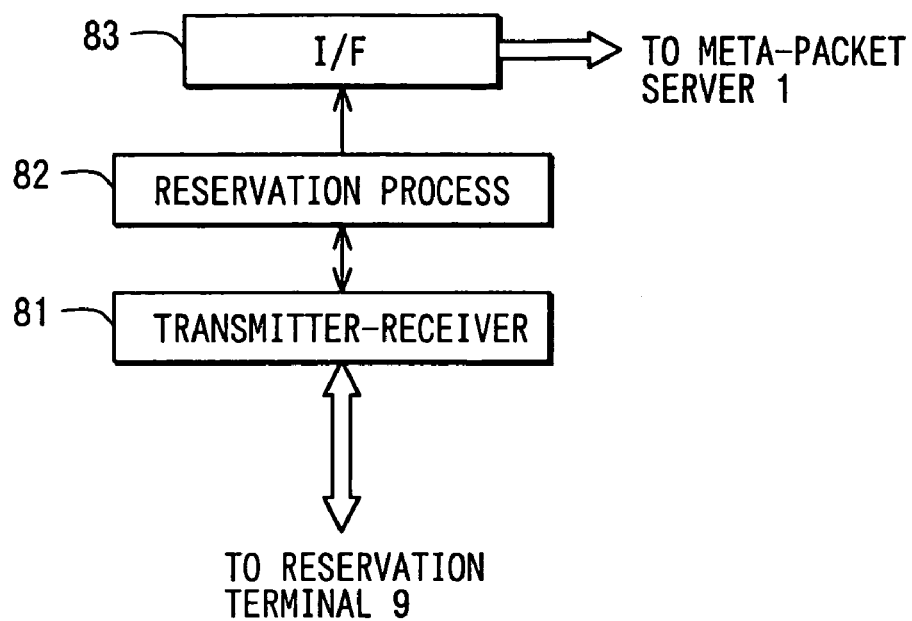
FIG. 15 shows a function configuration of a reservation server according to the fourth embodiment.
Figure 16:
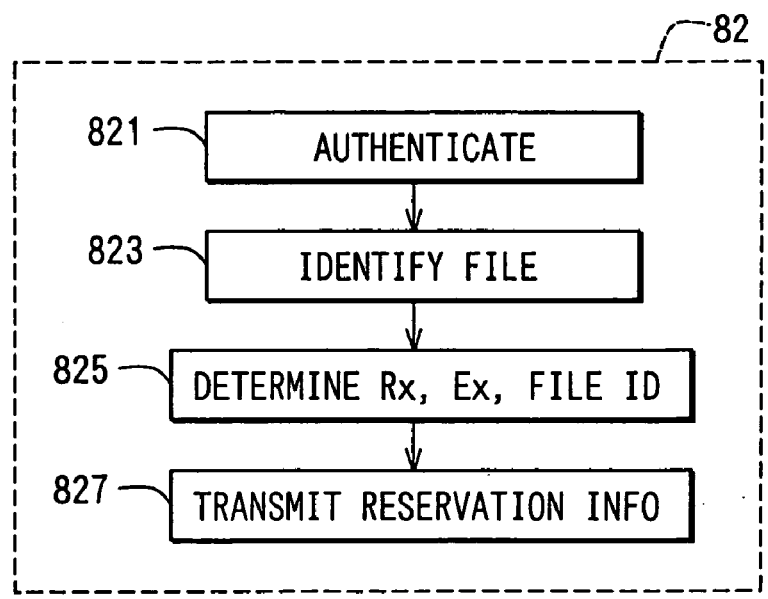
FIG. 16 shows functions of a reservation process section in detail according to the fourth embodiment.

FIG. 15 shows a function configuration of the reservation server 8. A reservation process section 82 is the function implemented as a program executed by the CPU of the reservation server 8. The reservation process section 82 interchanges information with the reservation terminal 9 via a transmitter-receiver 81. The transmitter-receiver 81 is a function for wireless communication with the reservation terminal 9. In addition, the reservation process section 82 interchanges information with the meta-packet server 1 via a network interface 83. The network interface 83 is a function for communication with the meta-packet server 1. FIG. 16 shows functions of the reservation process section 82 in detail.

The reservation process section 82 receives information including the client ID, the password, and the file name from the reservation terminal 9. The reservation process section 82 then retrieves a set of the received password and client ID from a list of sets of file IDs and passwords. This list is saved in a storage apparatus such as the HDD of the reservation process section 82. When the targeted set is not found as a result, the reservation process section 82 transmits information about rejection of the service to the reservation terminal 9 (Step 821). This step corresponds to the above-mentioned process (1).

When the targeted set is found, the reservation process section 82 identifies the received file name as being assigned to the file to be reserved (Step 823). The reservation process section 82 then determines the random number table Rx (or information to specify the same), the coded matrix Ex (or information to specify the same), and the file ID (Step 825). To do this step, it may be preferable to randomly choose from a range of predetermined values. Alternatively, it may be preferable to choose from the values in the ascending order.

The reservation process section 82 transmits the determined random number table Rx, the coded matrix Ex, and the file ID to the reservation terminal 9. This process corresponds to the above-mentioned process (2). Further, the reservation process section 82 transmits the determined random number table Rx, the coded matrix Ex, the file ID, the file name, and the client ID to the meta-packet server 1 (Step 827). This process corresponds to the above-mentioned process (3).

Figure 17:
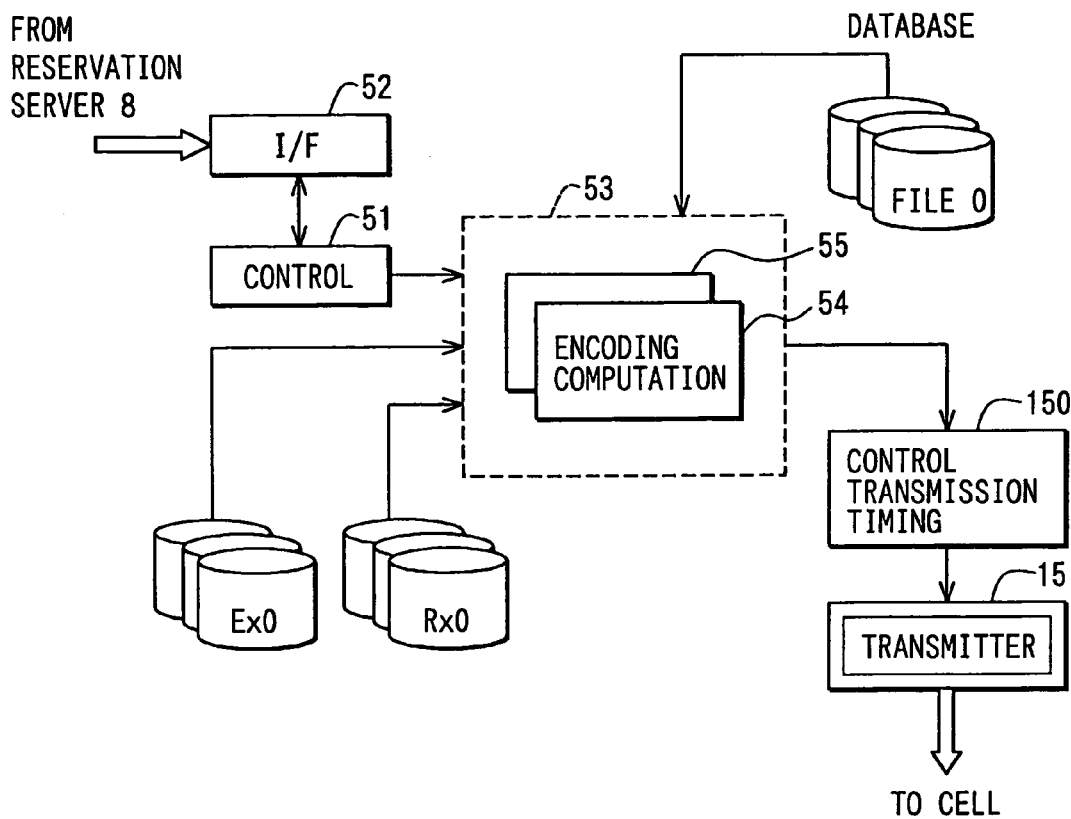
FIG. 17 shows a function configuration of a meta-packet server according to the fourth embodiment.

FIG. 17 shows a function configuration of the meta-packet server 1. A control section 51 is a function implemented as a program executed by the CPU 11 of the meta-packet server 1. A network interface 52 is a function to communicate with the reservation server 8. Via the network interface 52, the control section 51 receives the following from the reservation server 8: the random number table Rx (or information to specify the same), the coded matrix Ex (or information to specify the same), the file ID, the file name, and the client ID. This process corresponds to the above-mentioned process (3). The control section 51 then passes these pieces of information to a meta-packet generating section 53.

The meta-packet generating section 53 is also a program executed by the CPU 11 and generates a meta-packet generation process. The meta-packet generation process is equivalent to one of a plurality of encoding computation sections 54 and 55. These sections execute a process equivalent to that at Steps 101 through 109 in FIG. 2 for files corresponding to the passed file names. That is to say, the process encodes the file using the coded matrix Ex passed from the control section 51 or the coded matrix Ex specified by the passed information (Step 103). The process descrambles the file using the passed random number table Rx or the random number table Rx specified by the passed information (Step 105). The process adds the passed file ID to the UDP packet (Step 109). The information transmitted from the reservation server 8 to the meta-packet server 1 may specify the random number table Rx and the coded matrix Ex. That is to say, that information may be neither the random number table Rx nor the coded matrix Ex itself. In such case, the process reads the specified random number table Rx and the specified coded matrix Ex from the HDD 12 for use. For this purpose, the HDD 12 of the meta-packet server 1 stores a plurality of coded matrices and random number tables in advance. The reservation information will contain information indicating which of the matrices and the random number tables are actually used.

After the UDP packet containing meta-packets is generated as mentioned above, the transmission timing control process 150 and the transmitter 15 transmit that UDP packet via the antenna 16. The transmission timing control process 150 and the transmitter 15 in FIG. 17 have the functions equivalent to those of the transmission timing control process 150 and the transmitter 15 in FIG. 2. This process corresponds to the above-mentioned process (5).

Figure 18:
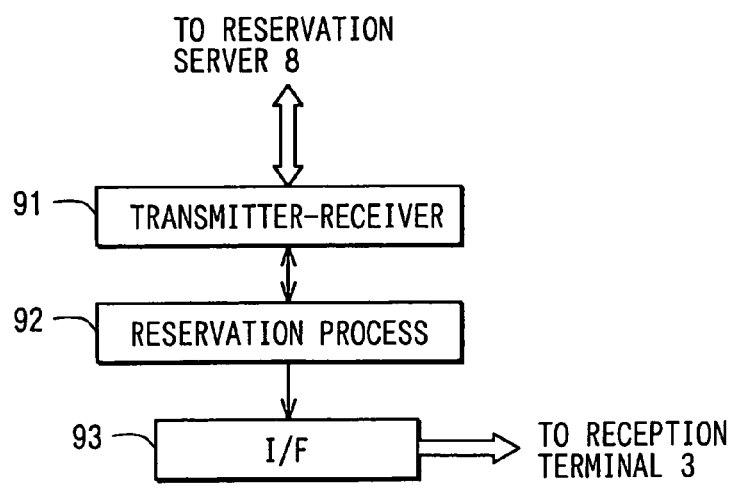
FIG. 18 shows a function configuration of a reservation terminal according to the fourth embodiment.
Figure 19:
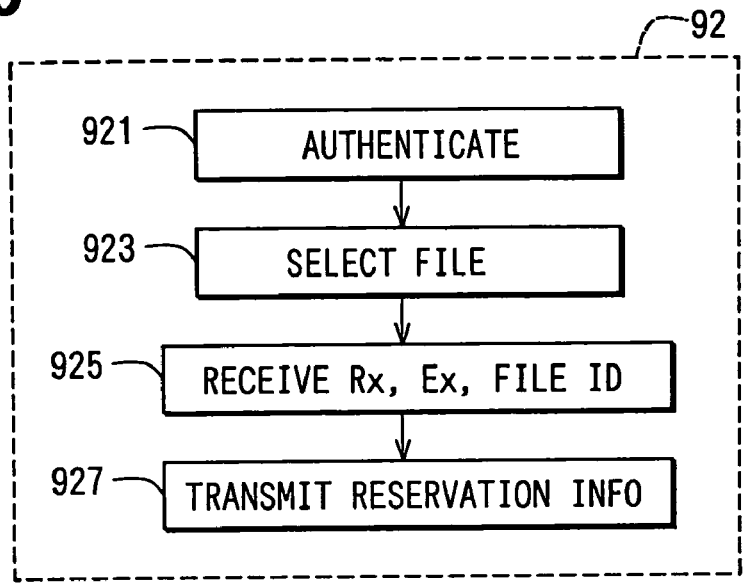
FIG. 19 shows functions of a reservation process section in detail according to the fourth embodiment.

FIG. 18 shows a function configuration of the reservation terminal 9. A reservation process section 92 is the function implemented as a program executed by the CPU. A transmitter-receiver 91 is the function for wireless communication with the reservation server 8. Via the transmitter-receiver 91, the reservation process section 92 interchanges information with the reservation server 8. A network interface 83 is the function to communicate with the reception terminal 3. Via the network interface 83, the reservation process section 92 interchanges information with the reception terminal 3. FIG. 19 shows functions of the reservation process section 92 in detail. A reservation information interface 93 is the function for communication with the reception terminal 3. The reservation information interface 93 may be available as wired connection, transfer capability using a memory card, infrared data communication, short-range wireless communication, and the like.

The reservation process section 92 accepts the client ID and the password from the user (Step 921). When the user enters a file name of contents to be reserved for distribution, the reservation process section 92 accepts that file name (Step 923). The reservation process section 92 transmits the accepted information to the reservation server 8. This process corresponds to the above-mentioned process (1). Based on this transmission, the reservation process section 92 receives the random number table Rx (or the information to specify the same), the coded matrix Ex (or the information to specify the same), and the file ID transmitted from the reservation server 8 (Step 925). This process corresponds to the above-mentioned process (2).

The reservation process section 92 transmits the received information to the reception terminal 3 (Step 927). This process corresponds to the above-mentioned process (4).

Figure 20:
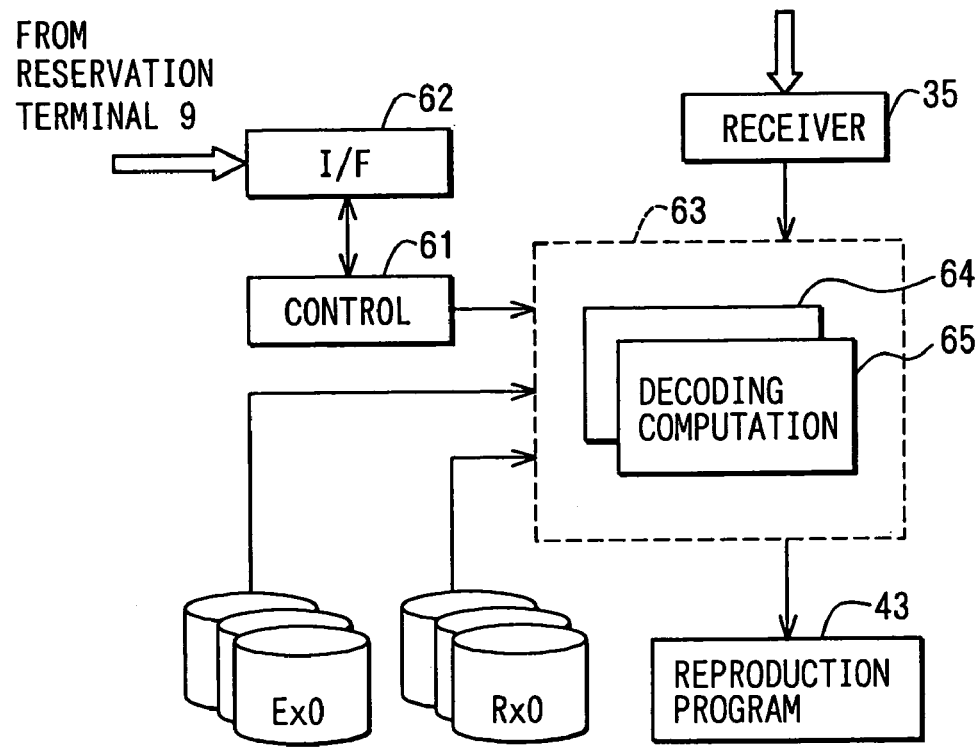
FIG. 20 shows a function configuration of the reception terminal according to the fourth embodiment.

FIG. 20 shows a function configuration of the reception terminal 3. A control section 61 is the function implemented as a program executed by the CPU 31 of the reception terminal 3. A network interface 62 is the function for communication with the reservation terminal 9. Via the network interface 62, the control section 61 receives the random number table Rx (or the information to specify the same), the coded matrix Ex (or the information to specify the same), and the file ID transmitted from the reservation terminal 9. This process corresponds to the above-mentioned process (4). The control section 61 then passes these pieces of information to a meta-packet decoding section 63.

The meta-packet decoding section 63 is also a program executed by the CPU 31 and generates a meta-packet decoding process. The meta-packet decoding process is equivalent to one of a plurality of decoding computation sections 64 and 65. These sections execute a process equivalent to that at Steps 720 through 735 in FIG. 9 for files corresponding to the passed file names. That is to say, the process extracts meta-packets from UDP packets having the file ID passed from the control section 61 (Step 720). These UDP packets are contained in UDP packets received from the meta-packet server 1 via a transmitter 35. When the number of extracted meta-packets reaches a necessary count, the process descrambles the file using the random number table Rx passed from the control section 61 (Step 725). Alternatively, the random number table Rx specified by the passed information may be used. The process restores the file using the passed coded matrix Ex or the coded matrix Ex specified by the passed information (Step 730). The information transmitted from the reservation terminal 9 to the reception terminal 3 may specify the random number table Rx and the coded matrix Ex. That is to say, that information may be neither the random number table Rx nor the coded matrix Ex itself. In such case, the process reads the specified random number table Rx and the specified coded matrix Ex from the HDD 32 for use. For this purpose, the HDD 32 of the reception terminal 3 stores a plurality of coded matrices and random number tables in advance. The reservation information will contain information indicating which of the matrices and the random number tables are actually used.

The reproduction program 43 in FIG. 9 reproduces the file that is restored as mentioned above.

The meta-packet server 1, the reception terminal 3, the reservation server 8, and the reservation terminal 9 operate for the processes (1) through (5). The reception terminal 3 is used to reserve the file for distribution. According to the above-mentioned operations, the meta-packet server 1 transmits the reserved file as meta-packets generated by using the file ID, the random number table Rx, and the coded matrix Ex determined by the reservation server 8. The reception terminal 3 receives the file. Likewise, it is possible to restore the reserved file from meta-packets received by using the file ID, the random number table Rx, and the coded matrix Ex determined by the reservation server 8.

The information distribution uses meta-packets, when collected to a required count, capable of restoring an original file based on the coded matrix. The meta-packets are provided with file IDs unique to respective files restored by the meta-packets. Accordingly, the receiving party can receive meta-packets by distinguishing which meta-packets should restore which files. When the user reserves a file using the reservation terminal 9, the reservation terminal 9 transmits a request to receive the file to the reservation server 8. When receiving this request, the reservation server 8 notifies the file ID, the coded matrix, and the random number table to the meta-packet server 1 and the reservation terminal 9. The reservation terminal 9 receives these pieces of information and transmits them to the reception terminal 3. Consequently, the meta-packet server 1 and the reception terminal 3 can use the same file ID, coded matrix, and random number table to distribute the associated file. When the reception terminal 3 receives the coded matrix and the like, only this reception terminal 3 can accept the information distribution. It is possible to provide the information distribution service that can prevent users other than those authorized from intercepting the distributed information. The information distribution uses fragment data, when collected to a required count, capable of restoring an original data aggregate based on the coded matrix. Therefore, it is possible to provide the information distribution appropriate to vehicle situations using such fragment data.

FIG. 21 shows relationship among file IDs, coded matrices, random number sequences, and types of files to be distributed that the embodiment uses. The file category is classified into three groups: free contents, charged public contents, and private contents.

The free contents is always available for a user of the vehicle having the reception terminal 3. The coded matrix and the random number table for the free contents files are made public. Every reception terminal 3 can use the coded matrix and the random number table for descrambling and decoding. In FIG. 21, numbers 0 are assigned to the coded matrices and the random number tables for advertisement and emergency information. That is to say, the reception terminal 3 reads the coded matrix and the random number table identified by number 0 from the storage medium such as the HDD to restore the file.

The charged public contents is available under contract to an information distributor and is intended for more than one qualified user. Contract types increase or decrease available categories such as news, sports, weather forecasts, and the like. The coded matrix and the random number table for the charged public contents are distributed to only the reception terminal 3 of contractors. When a user contracts with news and sports according to the example in FIG. 21, the coded matrix and the random number table assigned with number 1 become available. When the coded matrix and the random number table are stored in the reception terminal 3, they can be decoded.

The private contents such as software purchase is available only for a specific individual. To distribute the contents, a user performs purchase operations using the reservation terminal 9 as described in the embodiment. At this time, the reservation server 8 individually sets the file ID, the coded matrix, and the random number table. These pieces of information are finally notified to the reception terminal 3. In this manner, only the contractor can receive the intended information.

As mentioned above, the coded matrix and the random number table are changed depending on whether the information to be transmitted should be made public or limited to only contractors. Further, the coded matrix and the random number table are used as an encryption key. The encryption key is notified to specific users except the other users. This can make the highly secret information distribution available.

One of the coded matrix and the random number table may be used as an encryption key. In this case, the coded matrix or the random number table, whichever is not used as the encryption key, is made public.

Fifth Embodiment

Figure 22:
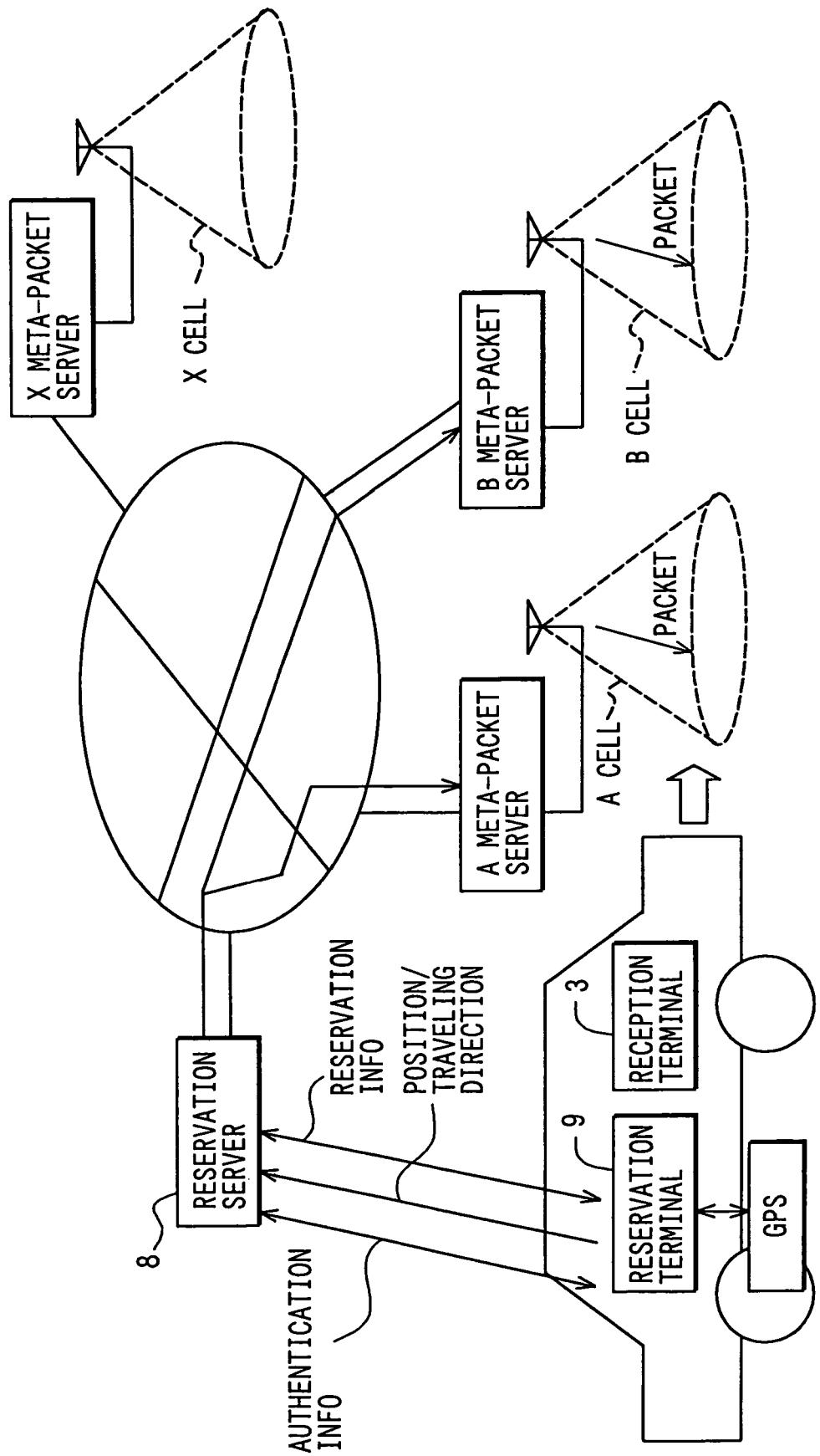
FIG. 22 shows an overview of the information distribution system according to a fifth embodiment.
Figure 23:
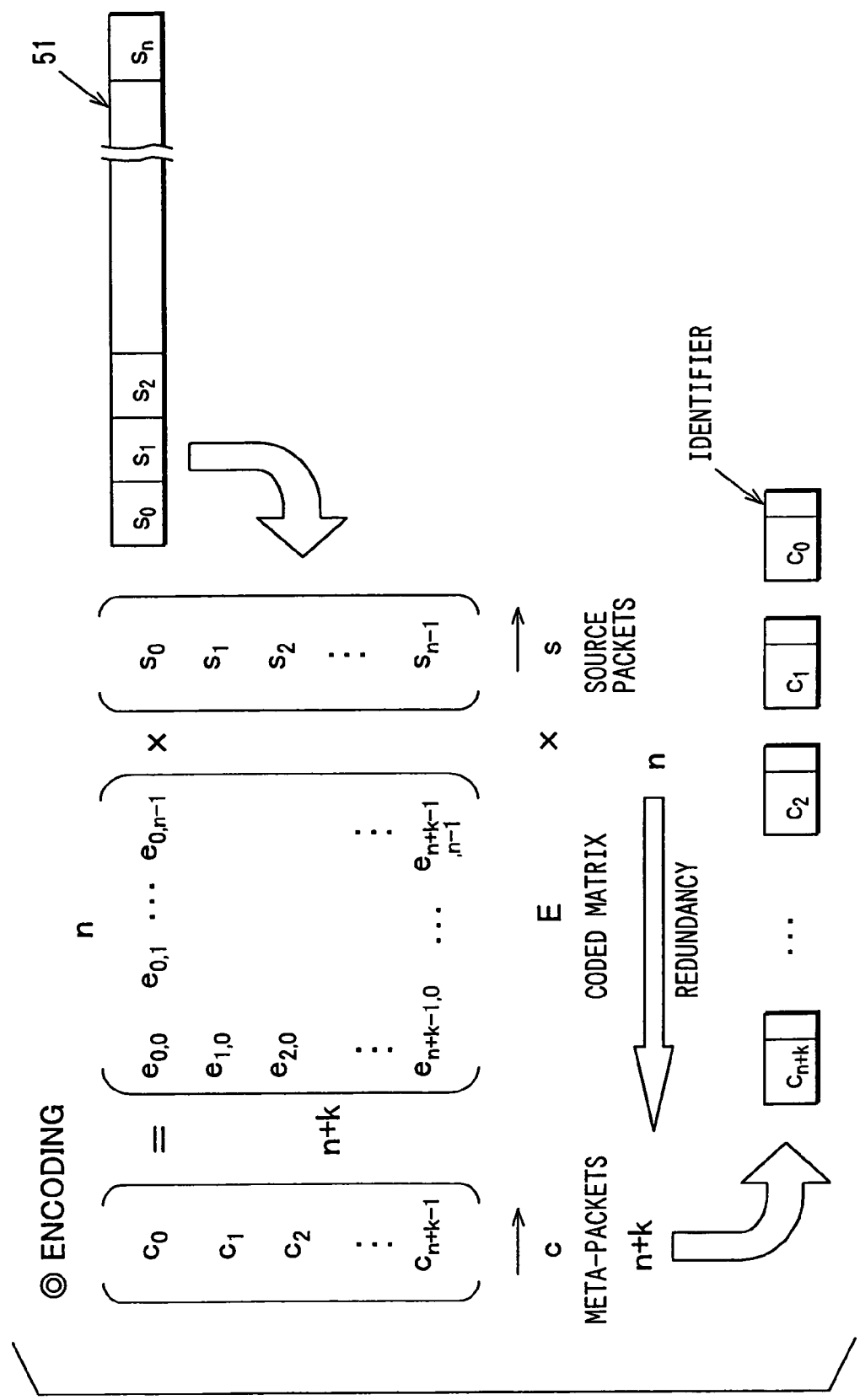
FIG. 23 shows relationship between an input file and a generated meta-packet based on a related art.
Figure 24:
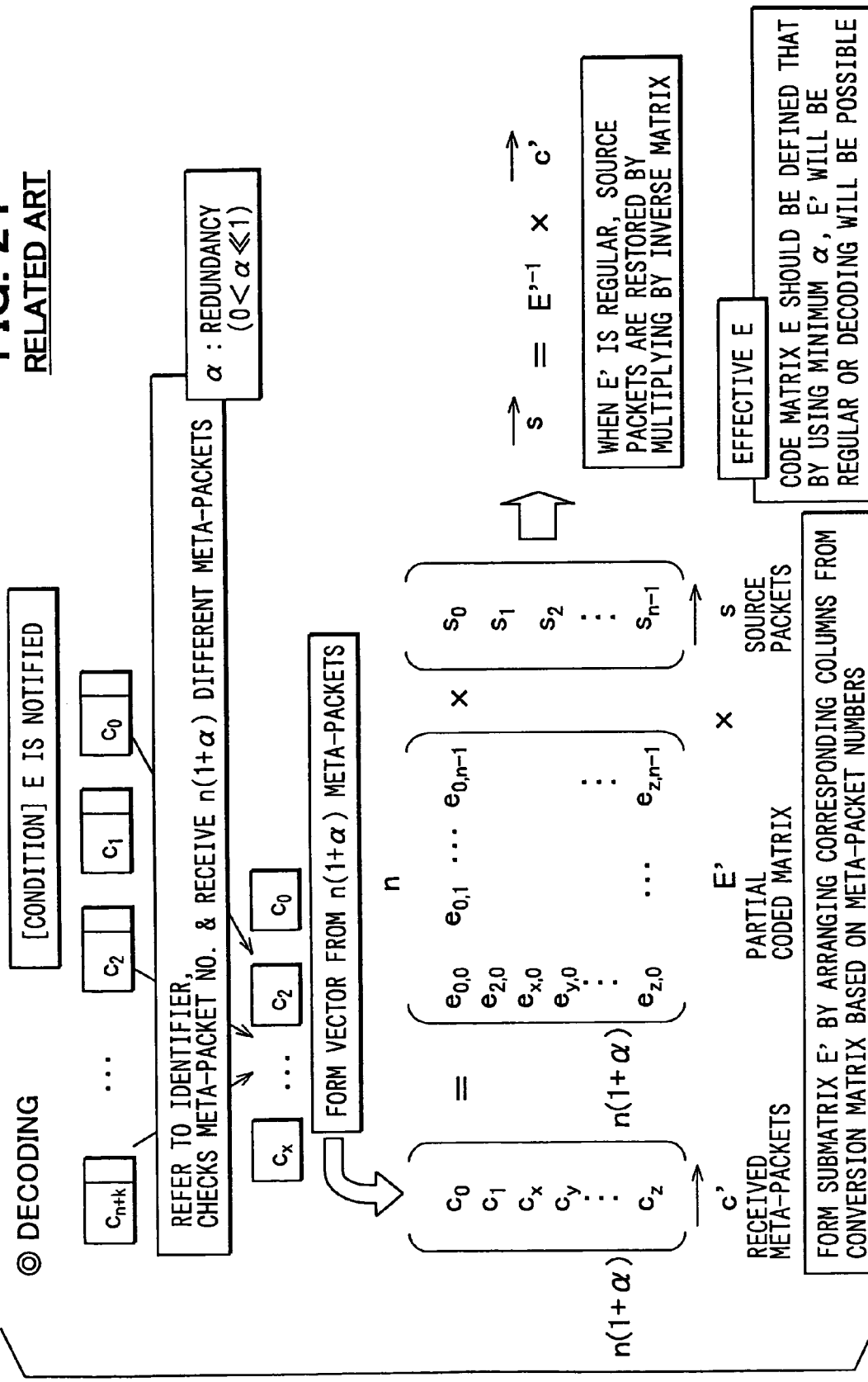
FIG. 24 schematically shows a method of restoring an original input file from an obtained meta-packet based on the related art.

A fifth embodiment of the present invention will now be described. FIG. 22 shows an overview of the information distribution system according to the fifth embodiment. The embodiment differs from the fourth embodiment in that the reservation server 8 transmits reservation information to a plurality of meta-packet servers. Further, the reservation terminal 9 detects its position and traveling direction at the time of reservation and notifies the information to the reservation server 8. Based on the position, the reservation server 8 distributes the reservation information only to the meta-packet server through which the vehicle is supposed to pass.

The reservation terminal 9 according to the present invention acquires positional information from a GPS receiver and the like mounted on the vehicle when transmitting the reservation information to the reservation server 8 at Step 927 in FIG. 19. The reservation terminal 9 detects the vehicle's traveling direction according to changes in the positional information. The reservation terminal 9 transmits the reservation information including the positional information and the traveling direction information to the reservation server 8.

The reservation server 8 receives the reservation information at Step 821 in FIG. 16. The reservation server 8 specifies a meta-packet server having a cell at a position through which the vehicle is supposed to pass. This operation is based on the received positional information and traveling direction information. At Step 827, the reservation information is transmitted only to the specified meta-packet server. In FIG. 22, for example, the reservation information is transmitted to only meta-packet servers A and B.

As a result, meta-packet servers A and B receive the reservation information and transmit the meta-packets based on the reservation information. Meta-Packet server X does not receive the reservation information. Therefore, this meta-packet server does not transmit the meta-packets associated with the reservation information.

In addition to the effects of the fourth embodiment, the fifth embodiment provides an additional effect. The embodiment does not perform the information distribution of the associated data in a wireless cell where no vehicle is available for the information distribution. It is possible to effectively use the radio resources for cells.

Other Embodiments

In the above-mentioned embodiments, the reception terminal 3 may be realized as a car navigation apparatus.

It will be obvious to those skilled in the art that various changes may be made in the above-described embodiments of the present invention. However, the scope of the present invention should be determined by the following claims.

What is claimed is:

1. A reception terminal communicating with an information distribution server including:
   fragment data generation means for generating fragment data with respect to a certain data aggregate that is one of a plurality of data aggregates using a coded matrix, wherein the fragment data is capable of restoring the certain data aggregate based on the coded matrix when the fragment data is collected to a required count;
   code provision means for providing the fragment data generated by the fragment data generation means with an identification code associated with the certain data aggregate restored by the fragment data; and
   transmission means for transmitting the fragment data having the identification code provided by the code provision means to the reception terminal,
   the reception terminal comprising:
   reception means for receiving the fragment data transmitted from the information distribution server; and
   restoration means for distinguishing the fragment data received by the reception means based on the identification code provided to the fragment data and restoring the certain data aggregate based on the coded matrix; and
   detection means for detecting a traveling speed of the reception terminal itself; wherein
   the plurality of data aggregates includes a digest data aggregate including digest information and a detailed data aggregate including detailed information whose category is equal to that of the digest information; and
   the reception means receives both fragment data generated from the digest data aggregate and fragment data generated from the detailed data aggregate;
   when the traveling speed detected by the speed detection means is not smaller than a specified value, the reception means receives the fragment data generated from the digest data aggregate, and
   when the traveling speed is smaller than the specified value, the reception means receives the fragment data generated from the detailed data aggregate.

2. The reception terminal of claim 1,
   wherein the fragment data generation means rearranges a transmission sequence of the generated fragment data using a random number table, and
   wherein the restoration means restores the certain data aggregate based on the coded matrix and the random number table.

3. The reception terminal of claim 1,
   wherein the plurality of data aggregates includes an emergency data aggregate including emergency information,
   wherein the code provision means of the information distribution server provides a specified identification code indicative of the emergency information to fragment data generated by the fragment data generation means from the emergency data aggregate, and
   wherein the reception means receives by priority the fragment data provided with the specified identification code indicative of the emergency information from the information distribution server.

4. An information distribution system including an information distribution server as a first apparatus, a reservation server as a second apparatus, a reservation terminal as a third apparatus, and a reception terminal as a fourth apparatus,
   wherein the information distribution server comprises:
   first reception means for receiving certain information specifying a data aggregate, an identification code, and a coded matrix from the reservation server;
   first fragment data generation means for generating fragment data with respect to the data aggregate specified by the certain information received by the first reception means by using the coded matrix specified by the certain information received by the first reception means, wherein the fragment data is capable of restoring the data aggregate based on the coded matrix when the fragment data is collected to a required count;
   first code provision means for providing the fragment data generated by the first fragment data generation means with the identification code specified by the certain information received by the first reception means; and
   first transmission means for transmitting the fragment data having the identification code provided by the first code provision means to the reception terminal,
   wherein the reservation server comprises:
   second reception means for receiving a request to transmit the data aggregate from the reservation terminal; and
   second transmission means for transmitting the certain information specifying the data aggregate, the identification code, and the coded matrix to the information distribution server based on reception of the second reception means, and for transmitting given information specifying the identification code and the coded matrix to the reservation terminal based on reception of the second reception means,
   wherein the reservation terminal comprises:
   third transmission means for transmitting the request to transmit the data aggregate to the reservation server;
   third reception means for receiving the given information specifying the identification code and the coded matrix from the reservation server; and
   third additional transmission means for transmitting the given information specifying the identification code and the coded matrix received by the third reception means to the reception terminal; and
   wherein the reception terminal comprises:
   fourth reception means for receiving the given information identifying the identification code and the coded matrix transmitted from the reservation terminal, and for receiving the fragment data having the identification code transmitted from the information distribution server based on the identification code specified by the given information received from the reservation terminal; and fourth restoration means for restoring the data aggregate from the fragment data having the identification code received by the fourth reception means based on the coded matrix specified by the given information received by the fourth reception means;

wherein, when the second reception means receives the request from the reservation terminal, the second transmission means transmits the certain information specifying the data aggregate, the identification code, and the coded matrix only to the information distribution server that is near a position of the reservation terminal.

5. An information distribution system of claim 4, wherein the first reception means receives the certain information specifying the data aggregate, the identification code, the coded matrix, and a random number table from the information distribution server, wherein the first transmission means uses the random number table, which is specified by the certain information received by the first reception means, to change a transmission sequence of the fragment data having the identification code provided by the code provision means before transmitting the fragment data to the reception terminal, wherein the second transmission means transmits the certain information specifying the data aggregate, the identification code, the coded matrix, and the random number table to the information distribution server based on the reception of the second reception means, wherein the second transmission means transmits the given information specifying the identification code, the coded matrix, and the random number table to the reservation terminal based on the reception of the second reception means, wherein the third reception means receives the given information specifying the identification code, the coded matrix, and the random number table from the reservation server, wherein the third additional transmission means transmits the given information specifying the identification code, the coded matrix, and the random number table received by the third reception means to the reception terminal, wherein the fourth reception means receives the given information specifying the identification code, the coded matrix, and the random number table from the reception terminal, and wherein the fourth restoration means restores the data aggregate based on the coded matrix and the random number table specified by the given information received by the fourth reception means.

6. The information distribution system of claim 5, wherein the coded matrix and the random number table are varied depending on whether the data aggregate is publicly distributed or is distributed to only a contractor.

7. The information distribution system of claim 5, wherein information specifying the coded matrix included in the certain information and the given information corresponds to information about which coded matrix to use, wherein information specifying the random number table included in the certain information and the given information corresponds to information about which random number table to use, wherein the first fragment data generation means of the information distribution server generates the fragment data using the coded matrix and the random number table, which are already stored in the information distribution server, based on the certain information, and wherein the fourth restoration means of the reception terminal restores the data aggregate using the coded matrix and the random number table, which are already stored in the reception terminal, based on the given information.

8. An information distribution system including an information distribution server as a first apparatus, a reservation server as a second apparatus, a reservation terminal as a third apparatus, and a reception terminal as a fourth apparatus, wherein the information distribution server comprises:

first reception means for receiving certain information specifying a data aggregate, an identification code, and a coded matrix from the reservation server;

first fragment data generation means for generating fragment data with respect to the data aggregate specified by the certain information received by the first reception means by using the coded matrix specified by the certain information received by the first reception means, wherein the fragment data is capable of restoring the data aggregate based on the coded matrix when the fragment data is collected to a required count;

first code provision means for providing the fragment data generated by the first fragment data generation means with the identification code specified by the certain information received by the first reception means; and first transmission means for transmitting the fragment data having the identification code provided by the first code provision means to the reception terminal, wherein the reservation server comprises:

second reception means for receiving a request to transmit the data aggregate from the reservation terminal; and second transmission means for transmitting the certain information specifying the data aggregate, the identification code, and the coded matrix to the information distribution server based on reception of the second reception means, and for transmitting given information specifying the identification code and the coded matrix to the reservation terminal based on reception of the second reception means, wherein the reservation terminal comprises:

third transmission means for transmitting the request to transmit the data aggregate to the reservation server;

third reception means for receiving the given information specifying the identification code and the coded matrix from the reservation server; and third additional transmission means for transmitting the given information specifying the identification code and the coded matrix received by the third reception means to the reception terminal; and wherein the reception terminal comprises:

fourth reception means for receiving the given information identifying the identification code and the coded matrix transmitted from the reservation terminal, and for receiving the fragment data having the identification code transmitted from the information distribution server based on the identification code specified by the given information received from the reservation terminal; and fourth restoration means for restoring the data aggregate from the fragment data having the identification code received by the fourth reception means based on the coded matrix specified by the given information received by the fourth reception means;

wherein the first reception means receives the certain information specifying the data aggregate, the identification code, the coded matrix, and a random number table from the information distribution server, wherein the first transmission means uses the random number table, which is specified by the certain information received by the first reception means, to change a transmission sequence of the fragment data having the identification code provided by the code provision means before transmitting the fragment data to the reception terminal, wherein the second transmission means transmits the certain information specifying the data aggregate, the identification code, the coded matrix, and the random number table to the information distribution server based on the reception of the second reception means, wherein the second transmission means transmits the given information specifying the identification code, the coded matrix, and the random number table to the reservation terminal based on the reception of the second reception means, wherein the third reception means receives the given information specifying the identification code, the coded matrix, and the random number table from the reservation server, wherein the third additional transmission means transmits the given information specifying the identification code, the coded matrix, and the random number table received by the third reception means to the reception terminal, wherein the fourth reception means receives the given information specifying the identification code, the coded matrix, and the random number table from the reception terminal, and wherein the fourth restoration means restores the data aggregate based on the coded matrix and the random number table specified by the given information received by the fourth reception means;

wherein the coded matrix and the random number table are varied depending on whether the data aggregate is publicly distributed or is distributed to only a contractor.

9. An information distribution system including an information distribution server as a first apparatus, a reservation server as a second apparatus, a reservation terminal as a third apparatus, and a reception terminal as a fourth apparatus, wherein the information distribution server comprises:

first reception means for receiving certain information specifying a data aggregate, an identification code, and a coded matrix from the reservation server;

first fragment data generation means for generating fragment data with respect to the data aggregate specified by the certain information received by the first reception means by using the coded matrix specified by the certain information received by the first reception means, wherein the fragment data is capable of restoring the data aggregate based on the coded matrix when the fragment data is collected to a required count;

first code provision means for providing the fragment data generated by the first fragment data generation means with the identification code specified by the certain information received by the first reception means; and first transmission means for transmitting the fragment data having the identification code provided by the first code provision means to the reception terminal, wherein the reservation server comprises:

second reception means for receiving a request to transmit the data aggregate from the reservation terminal; and second transmission means for transmitting the certain information specifying the data aggregate, the identification code, and the coded matrix to the information distribution server based on reception of the second reception means, and for transmitting given information specifying the identification code and the coded matrix to the reservation terminal based on reception of the second reception means, wherein the reservation terminal comprises:

third transmission means for transmitting the request to transmit the data aggregate to the reservation server;

third reception means for receiving the given information specifying the identification code and the coded matrix from the reservation server; and third additional transmission means for transmitting the given information specifying the identification code and the coded matrix received by the third reception means to the reception terminal; and wherein the reception terminal comprises:

fourth reception means for receiving the given information identifying the identification code and the coded matrix transmitted from the reservation terminal, and for receiving the fragment data having the identification code transmitted from the information distribution server based on the identification code specified by the given information received from the reservation terminal; and fourth restoration means for restoring the data aggregate from the fragment data having the identification code received by the fourth reception means based on the coded matrix specified by the given information received by the fourth reception means;

wherein the first reception means receives the certain information specifying the data aggregate, the identification code, the coded matrix, and a random number table from the information distribution server, wherein the first transmission means uses the random number table, which is specified by the certain information received by the first reception means, to change a transmission sequence of the fragment data having the identification code provided by the code provision means before transmitting the fragment data to the reception terminal, wherein the second transmission means transmits the certain information specifying the data aggregate, the identification code, the coded matrix, and the random number table to the information distribution server based on the reception of the second reception means, wherein the second transmission means transmits the given information specifying the identification code, the coded matrix, and the random number table to the reservation terminal based on the reception of the second reception means, wherein the third reception means receives the given information specifying the identification code, the coded matrix, and the random number table from the reservation server, wherein the third additional transmission means transmits the given information specifying the identification code, the coded matrix, and the random number table received by the third reception means to the reception terminal, wherein the fourth reception means receives the given information specifying the identification code, the coded matrix, and the random number table from the reception terminal, and wherein the fourth restoration means restores the data aggregate based on the coded matrix and the random number table specified by the given information received by the fourth reception means;

wherein information specifying the coded matrix included in the certain information and the given information corresponds to information about which coded matrix to use, wherein information specifying the random number table included in the certain information and the given information corresponds to information about which random number table to use, wherein the first fragment data generation means of the information distribution server generates the fragment data using the coded matrix and the random number table, which are already stored in the information distribution server, based on the certain information, and wherein the fourth restoration means of the reception terminal restores the data aggregate using the coded matrix and the random number table, which are already stored in the reception terminal, based on the given information.

* * * * *